(12) United States Patent
Moore et al.

(10) Patent No.: US 11,817,090 B1
(45) Date of Patent: Nov. 14, 2023

(54) ENTITY RESOLUTION USING ACOUSTIC DATA

(71) Applicant: Amazon Technologies, Inc., Seattle, WA (US)

(72) Inventors: James Claiborne Moore, Boston, MA (US); Majid Laali, Toronto (CA); Yasser Gonzalez Fernandez, Toronto (CA); Siyong Liang, Brookline, MA (US); Ameya Ashok Limaye, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 237 days.

(21) Appl. No.: 16/712,394

(22) Filed: Dec. 12, 2019

(51) Int. Cl.
*G10L 15/187* (2013.01)
*G10L 15/22* (2006.01)
*G10L 15/02* (2006.01)
*G10L 15/18* (2013.01)

(52) U.S. Cl.
CPC ............ *G10L 15/187* (2013.01); *G10L 15/02* (2013.01); *G10L 15/1815* (2013.01); *G10L 15/22* (2013.01); *G10L 2015/025* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 9,384,188 B1* | 7/2016 | Levit | | G10L 15/22 |
| 9,454,957 B1* | 9/2016 | Mathias | | G06F 40/295 |
| 9,934,777 B1* | 4/2018 | Joseph | | G10L 15/22 |
| 10,403,278 B2* | 9/2019 | Skilling | | G10L 15/22 |
| 2007/0088547 A1* | 4/2007 | Freedman | | G10L 19/0018 704/235 |
| 2016/0133253 A1* | 5/2016 | Braho | | G10L 15/065 704/251 |
| 2018/0068661 A1* | 3/2018 | Printz | | G06F 40/295 |
| 2018/0233163 A1* | 8/2018 | Eagleman | | G10L 15/02 |

* cited by examiner

*Primary Examiner* — Jonathan C Kim
*Assistant Examiner* — Jonathan Ernesto Amaya Hernandez
(74) *Attorney, Agent, or Firm* — PIERCE ATWOOD LLP

(57) ABSTRACT

A phonetic search system may pass phonetic information from an automatic speech recognition (ASR) system to a natural language understanding (NLU) system for the latter to leverage when performing entity resolution in the presence of ambiguous interpretations. The ASR system may include an acoustic model and a language model. The acoustic model can process audio data to generate hypotheses that can be mapped to acoustic data; i.e., one or more acoustic units such as phonemes. The language model can process the acoustic units to generate text data representing possible transcriptions of the audio data. ASR/NLU systems may have difficulty interpreting speech when confronted with, for example, homographs, which are words that are spelled the same, but have different meanings. When uncertainty in the final transcription is high, the system can leverage the acoustic data to improve the accuracy of entity resolution.

23 Claims, 15 Drawing Sheets

FIG. 8
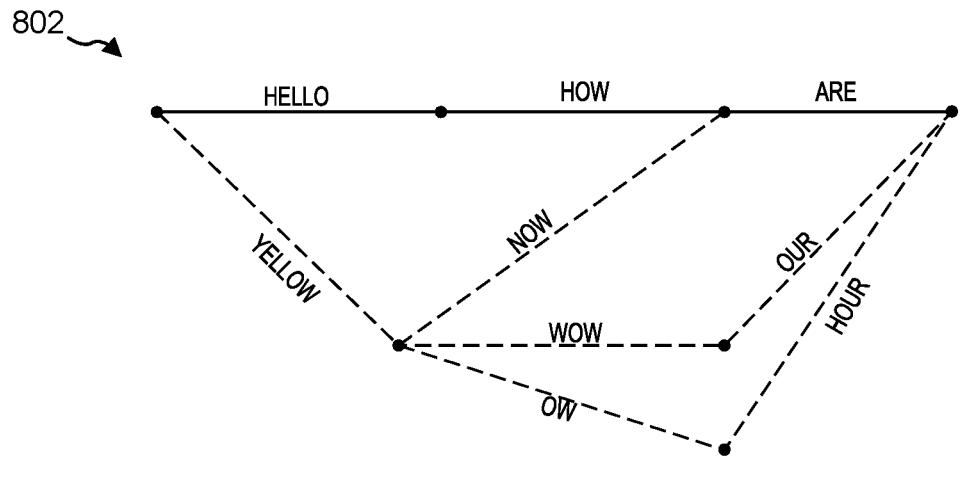
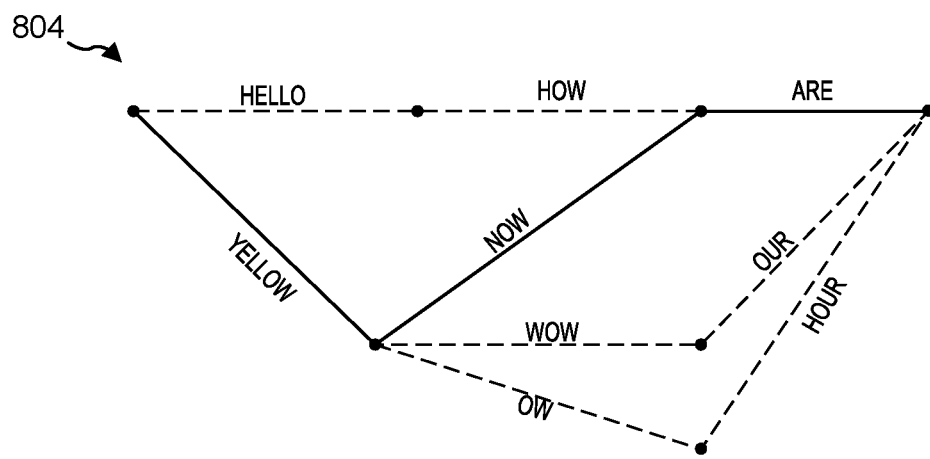
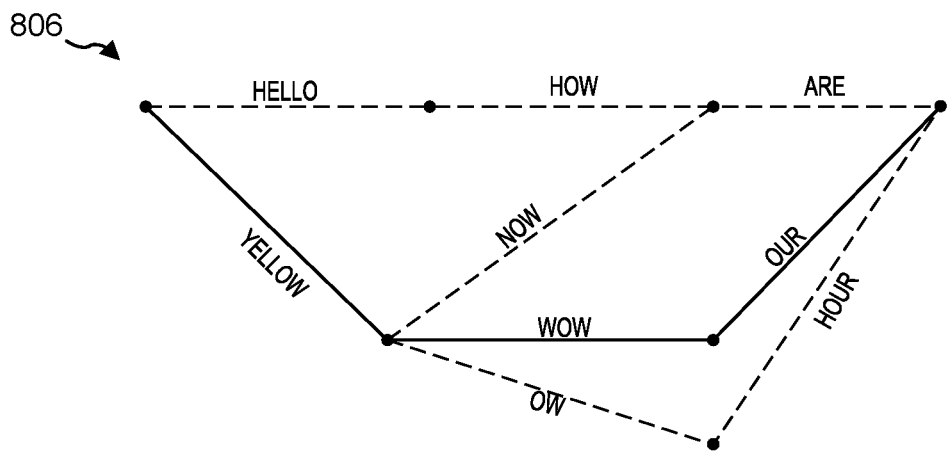

ENTITY RESOLUTION USING ACOUSTIC DATA

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 8 illustrates speech recognition lattices according to one aspect of the present disclosure.

DETAILED DESCRIPTION

Figure 1:
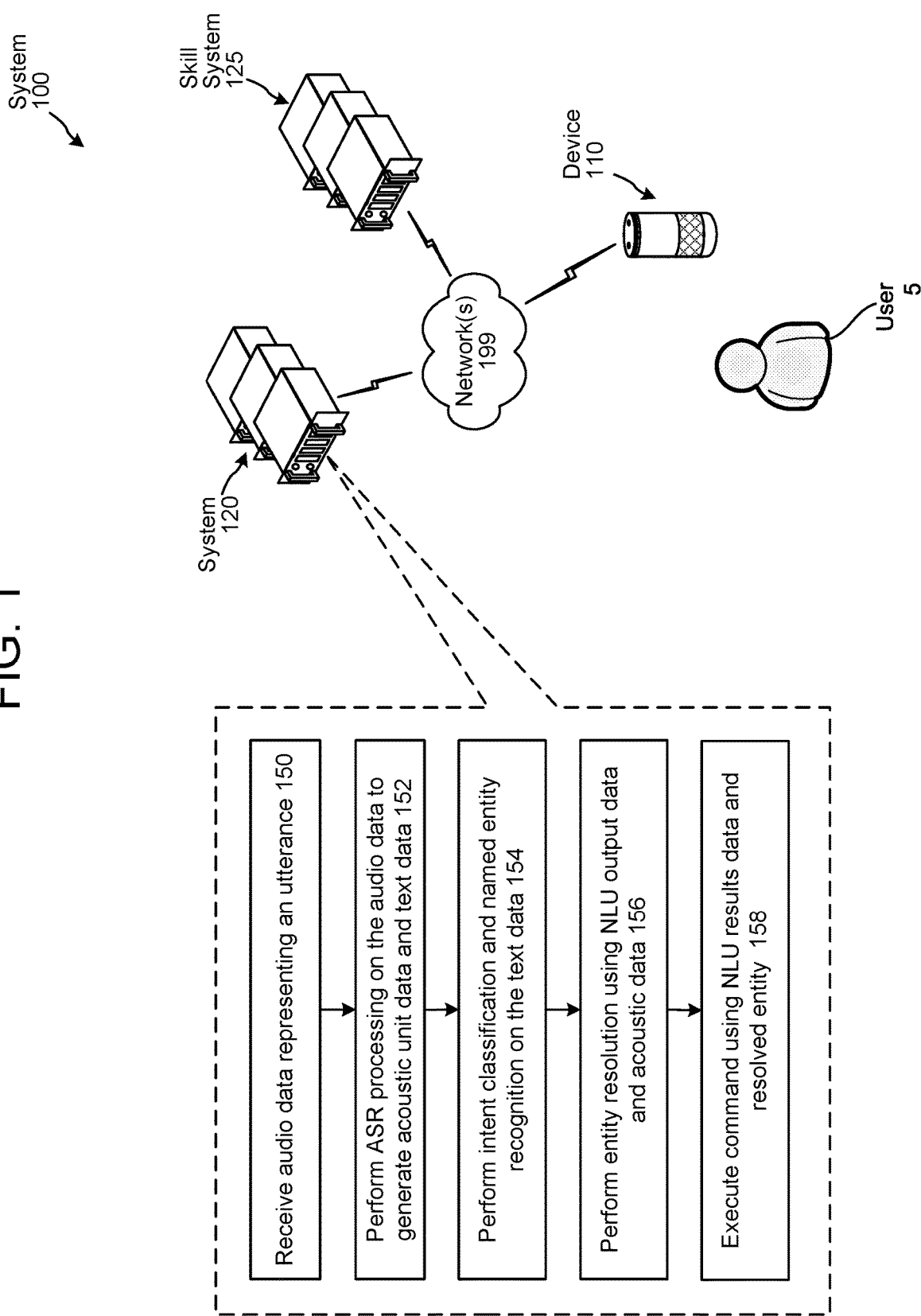
FIG. 1 is a conceptual diagram illustrating a system configured to perform entity resolution using acoustic data, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of computer science concerning transforming textual and/or other data into audio data that is synthesized to resemble human speech.

A system may cause skill systems to perform actions in response to natural language inputs (e.g., spoken inputs and/or typed inputs). For example, for the natural language input "play Adele music," a music skill system may be invoked to output music sung by an artist named Adele. For further example, for the natural language input "turn on the lights," a smart home skill system may be invoked to turn on "smart" lights associated with a user's profile. In another example, for the natural language input "what is the weather," a weather skill system may be invoked to output weather information for a geographic location corresponding to the device that captured the natural language input. In the foregoing examples, actions correspond to the outputting of music, turning on of "smart" lights, and outputting of weather information. As such, as used herein, an "action" may refer to some result of a skill system's processing.

A system may receive a natural language input. For example, a user may speak a natural language input to a device, and the device may send audio data, representing the spoken natural language input, to the system. The system may perform ASR processing on the audio data to generate text data representing the spoken natural language input. The system may perform NLU processing on the text data to determine an intent of the spoken natural language input as well as portions of the text data that may be used to perform an action responsive to the spoken natural language input.

When performing ASR, the system may include an acoustic model and a language model. The acoustic model can process audio data to generate hypotheses that can be mapped to acoustic data; i.e., one or more acoustic units such as phonemes. The language model can process the acoustic units to generate text data representing possible transcriptions the audio data. ASR/NLU systems may have difficulty interpreting speech when confronted with ambiguity in the language, such as homophones and/or homographs. A homophone refers to each of two or more words with similar or equivalent pronunciation but different meanings, origins, or spellings; for example, "Stewart" versus "Stuart," "to"/"too"/"two," and "cashed"/"cached." A homograph may refer to each of two or more words spelled the same, but not necessarily pronounced the same, and having different meanings and origins; for example, "rose" (flower) versus "rose" (past tense of "rise"), "moped" (motorized bike)/"moped" (brooded), and "tear" (cry)/"tear" (rip). Thus, the presence of homophones and/or homographs in the text data may increase uncertainty as to entities represented in the final transcription. When uncertainty in the final transcription is high, the acoustic data may represent the customer request more accurately. This disclosure therefore proposes a phonetic search system that passes phonetic information from the ASR system to the NLU for the latter to leverage when performing entity resolution in the presence of ambiguous interpretations.

FIG. 1 shows a system 100 configured to perform entity resolution using acoustic data. Although the figures and discussion of the present disclosure illustrate certain steps in a particular order, the steps described may be performed in a different order (as well as certain steps removed or added) without departing from the present disclosure. As shown in FIG. 1, the system 100 may include a device 110 (local to a user 5), a natural language command processing system 120, and a skill system 125 connected across one or more networks 199. While the user 5 is illustrated as being a human, other types of users (e.g., computing systems) may exist.

The device 110 may receive audio corresponding to a spoken natural language input originating from the user 5. The device 110 may generate audio data corresponding to the audio, and may send the audio data to the system 120. The device 110 may send the audio data to the system 120 via an application that is installed on the device 110 and associated with the system 120. An example of such an application is the Amazon Alexa application that may be installed on a smart phone, tablet, or the like.

The system 100 can receive audio data representing an utterance (150), perform automatic speech recognition (ASR) processing on the audio data to generate acoustic unit data and text data (152), perform intent classification (IC) and named entity recognition (NER) on the text data (154), perform entity resolution using the NLU output data and acoustic data (156), and, in some implementations, the system 100 can use the NLU results data and resolved entity to cause a command to be executed (158).

The system 100 can receive audio data representing an utterance (150). The user 5 can speak a command into the device 110. The device 110 can convert the audio signal into audio data for transmission across the network 199 to the system 120. In some implementations, certain steps of ASR processing and/or NLU processing may be performed on the device 110, in which case the data provided by the device 110 to the system 120 may include text data or a combination of audio data and text data. In some implementations, the audio and/or text data may be encoded or encrypted for transmission to the system 120. The device 110 is described in further detail below with reference to FIG. 13. Examples of device 110 types are provided below with reference to FIG. 15.

The system 100 can perform automatic speech recognition (ASR) processing on the audio data to generate acoustic unit data and text data (152). The system 100 may perform ASR with an acoustic model and a language model. The acoustic model can process audio data to generate hypotheses that can be mapped to acoustic data; i.e., one or more acoustic units such as phonemes. The language model can process the acoustic units to generate text data representing possible transcriptions of the audio data. The result of ASR processing can include text data or sets of text data representing one or more hypotheses representing different possible text transcriptions of the audio data. The system 100 can store the acoustic units and the text data. Furthermore, the system 100 can store relationship data to preserve the linkage between each portion of the text data and the acoustic units from which the portion of the text data was derived. The ASR process is described further below with reference to FIGS. 4, 5.

The system 100 can perform intent classification (IC) and named entity recognition (NER) on the text data (154). The system 100 can process the text data to determine an intent of an utterance represented by the audio data. The processing can further determine a skill invoked by the intent. The system 100 can also perform NER to detect that certain portions of the text data represents an input or a parameter into the natural language command processing system. (Generating and ranking hypotheses as to what the entity is, is left for another step.) The result of this stage of processing can include an n-best list of possible NLU hypotheses. The n-best list can include possible intents corresponding to respective skills and/or domains. Each hypothesis may include one or more slots representing entities recognized during this stage of NLU processing. The entities can be resolved in the following stage.

The system 100 can perform entity resolution using the NLU output data and acoustic data (156). The system 100 of this disclosure improves on prior ASR/NLU systems, however, by leveraging acoustic data in the entity resolution. The system 100 can leverage acoustic data for entity resolution in various ways. For example, the system 100 can query a joint phonetic/lexical index for every recognized entity. Alternatively, the system 100 can perform dual concurrent (or staggered, or serial) searches in separate phonetic and lexical indices. In some cases, the system 100 can limit acoustic data searches to entities with confidence scores falling below a threshold; that is, the system 100 will only include an acoustic data search if the system's 100 confidence in its interpretation of the audio data is low. In some implementations, the system 100 can apply a weighting factor to the phonetic search results and lexical search results. The system 100 can adjust the weighting factor heuristically based on training data. Alternatively, an administrator of the system 100 can set the weighting factor. The system 100 can output NLU results data following entity resolution, weighting and hypotheses ranking. Further details of NLU processing and entity resolution are described further below with reference to FIGS. 11 and 12.

In some implementations, the system 100 can use the NLU results data and resolved entity to cause a command to be executed (158). The NLU results data can include an intent and one or more corresponding entities, or a ranked list of intents and corresponding entities. The system 100 can cause execution of performance of a command representing by one of the intents and corresponding entities. In some cases, the system 100 will transmit a request to a skill system 125 to perform an operation related to the command. An example system 120 and/or skill system 125 is described in further detail below with reference to FIG. 14.

Figure 2:
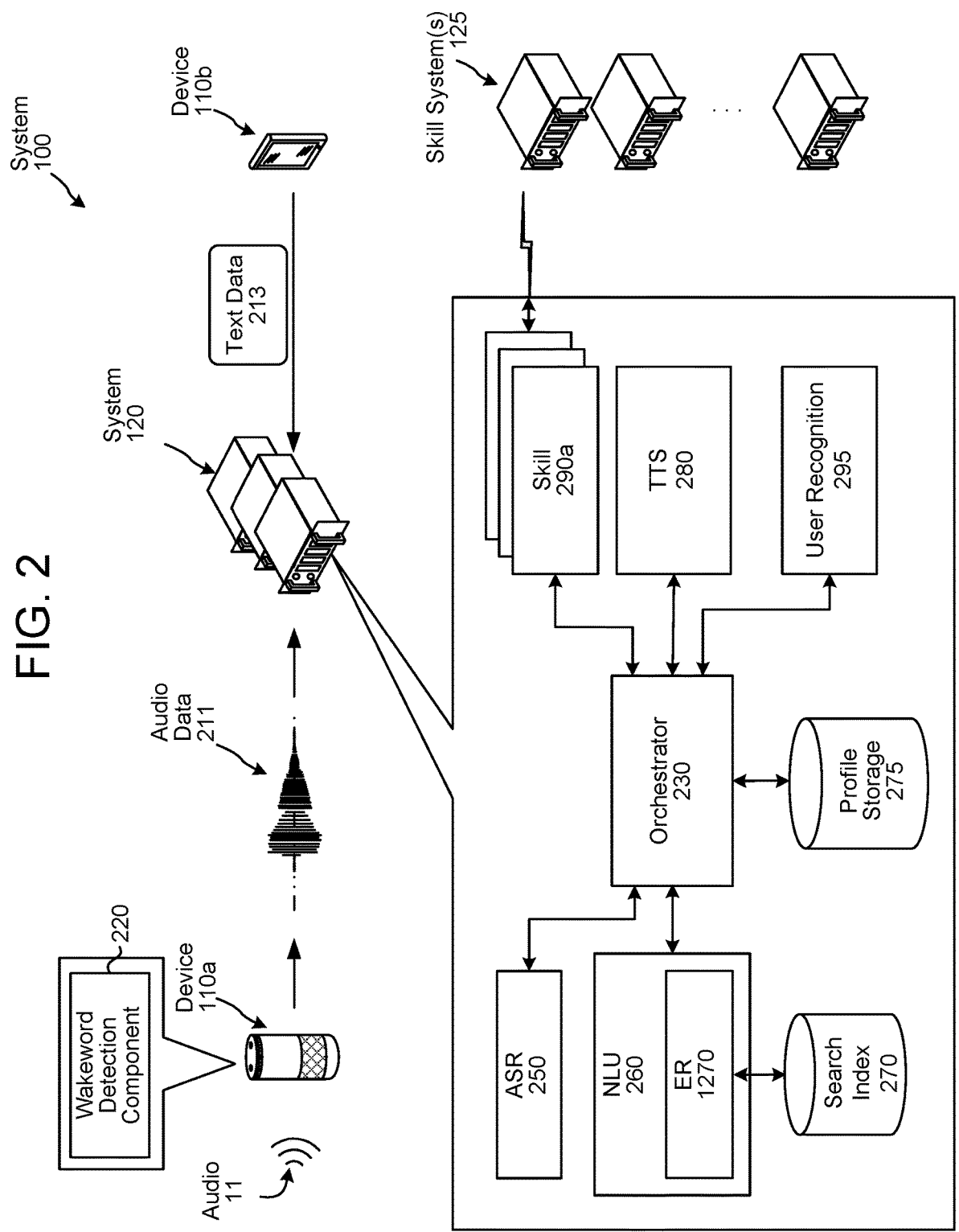
FIG. 2 is a conceptual diagram of components of the system, according to embodiments of the present disclosure.

The system 100 may operate using various components as described in FIG. 2. The various components may be located on a same or different physical devices. Communication between various components of the system 100 may occur directly or across a network(s) 199. Communications between the internal components of the system 120 are described further below with reference to FIG. 3.

A system such as the system 100 may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 2 is a conceptual diagram of components of the system 100, according to embodiments of the present disclosure. As shown in FIG. 2, an audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage. Such acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 220 to perform wakeword detection to determine when a user intends to speak an input to the system 120. An example wakeword is "Alexa." As used herein, a "wakeword" may refer to a single word or more than one consecutive words in speech.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110a may "wake" and begin transmitting audio data 211, representing the audio 11, to the system 120. The audio data 211 may include data corresponding to the wakeword, or the device 110a may remove the portion of the audio corresponding to the wakeword prior to sending the audio data 211 to the system 120.

Figure 3:
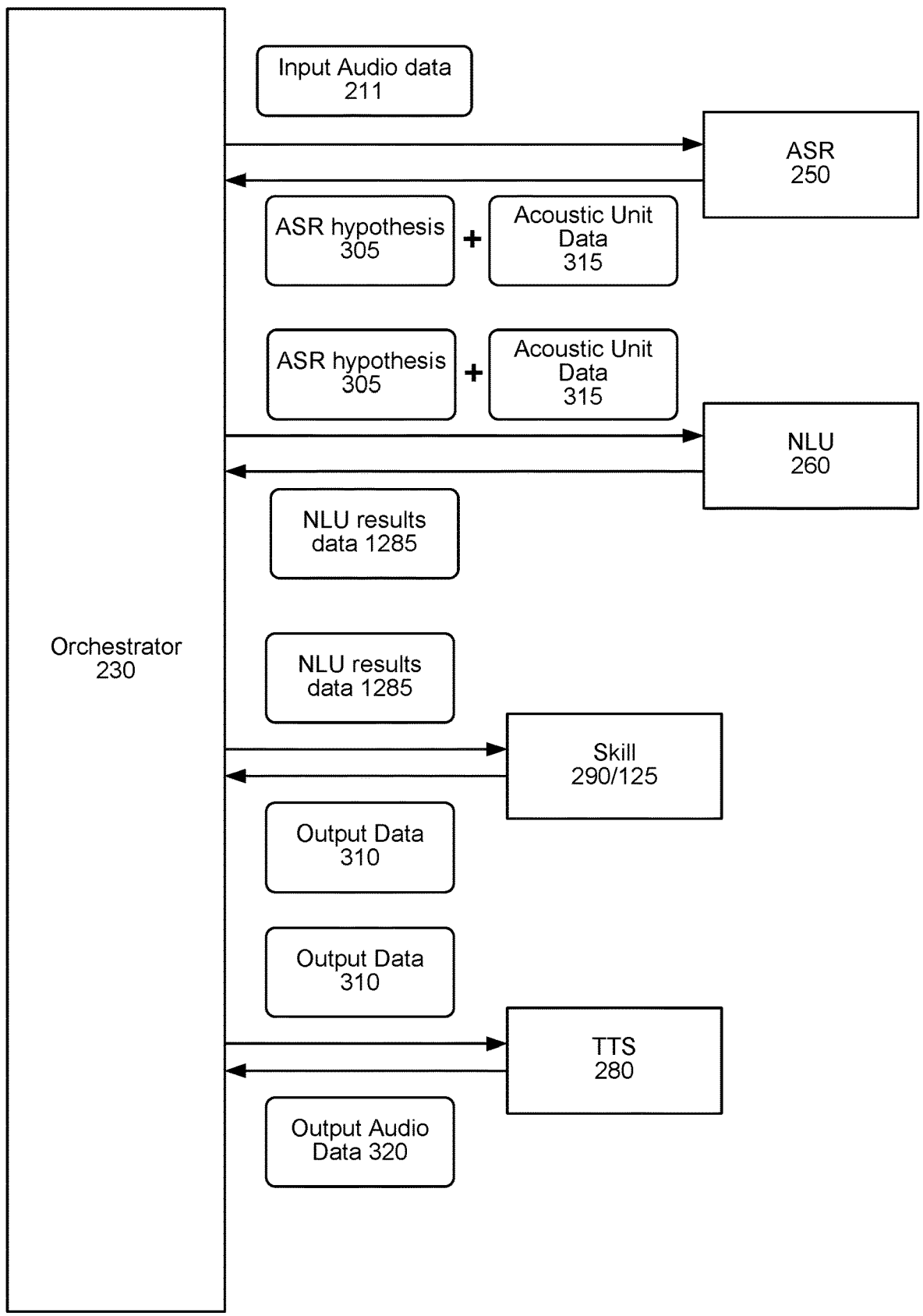
FIG. 3 is a conceptual diagram illustrating how a spoken natural language input may be processed at runtime, according to embodiments of the present disclosure.

The system 120 may include an orchestrator component 230 configured to receive the audio data 211 (and optionally an assistant identifier) from the device 110a. The orchestrator component 230 may include memory and logic that enables the orchestrator component 230 to transmit various pieces and forms of data to various components of the system 100, as well as perform other operations. For example, as shown in FIG. 3, the orchestrator component 230 may send the audio data 211 to an ASR component 250 (conceptually illustrated in FIGS. 4 and 5 and discussed below), may receive text and acoustic data from the ASR component 250 and forward them to an NLU component 260 (conceptually illustrated in FIGS. 11 and 12 and discussed below). The NLU component 260 may process the text and acoustic data using a joint lexical/phonetic search index 270 to generate NLU results data. The NLU 260 may also include an entity resolution component 1270, as discussed further below. The orchestrator component 230 may receive the NLU results data from the NLU component 260 and forward them to a skill 290 and/or a skill system 125. The orchestrator component 230 may receive output data 310 from the skill 290 and/or skill system 125 and cause performance of one or more actions in response to the input audio data 211. In some implementations, the orchestrator component 230 can forward the output data 310 to the TTS component 280 for generating a spoken-word response to the input audio data 211. The orchestrator component 230 may receive output audio data 320 from the TTS component 280, and may transmit the output audio data back to the device 110a for output to the user 5.

FIG. 3 conceptually illustrates how a spoken natural language input may be processed at runtime within the system 120. After the orchestrator component 230 receives the audio data 211 corresponding to a spoken natural language input, the orchestrator component 230 may send the audio data 211 to the ASR component 250. The ASR component 250 transcribes audio data into one or more ASR hypotheses 305 (e.g., one or more different textual representations of the speech contained in the audio data). The ASR hypothesis 305 (or the top-scoring ASR hypothesis when multiple ASR hypotheses are generated for a single natural language input) may be used by various components of the system 120 for various purposes. A top-scoring ASR hypothesis 305 (and/or other ASR hypotheses), which includes the text data corresponding to the most likely transcription of the audio data 211 may be sent from the ASR component 250 to the orchestrator 230. The ASR component 250 can also return acoustic unit data 315 corresponding to some or all of the text data in the ASR hypotheses 305. Further details of the operation of the ASR component 250 are described below with reference to FIGS. 4 and 5.

Figure 4:
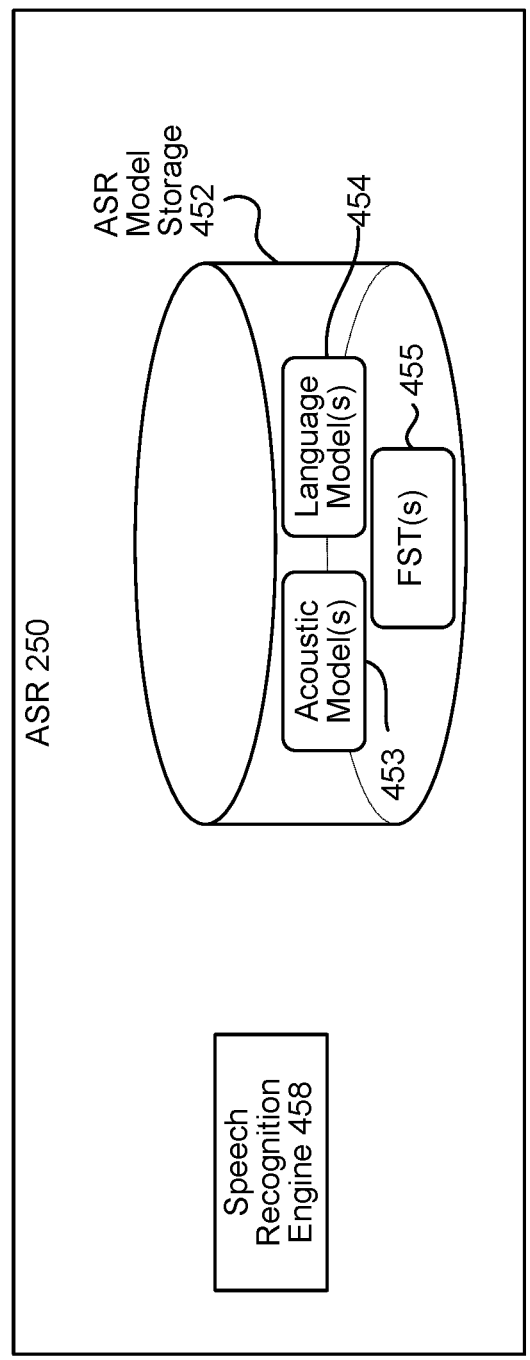
FIG. 4 is a conceptual diagram of an ASR component, according to embodiments of the present disclosure.

FIG. 4 is a conceptual diagram of an ASR component 250, according to embodiments of the present disclosure. The ASR component 250 may interpret a spoken natural language input based on the similarity between the spoken natural language input and pre-established language models 454 stored in an ASR model storage 452. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 455 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 453 stored in the ASR model storage 452), and the likelihood that a particular word, which matches the sounds, would be included in the sentence at the specific location (e.g., using a language or grammar model 454). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 458. The ASR component 250 receives audio data 211 (for example, received from a local device 110 having processed audio detected by a microphone by an acoustic front end (AFE) or other component). The speech recognition engine 458 compares the audio data 211 with acoustic models 453, language models 454, FST(s) 455, and/or other data models and information for recognizing the speech conveyed in the audio data. The audio data 211 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 458 may process the audio data 211 with reference to information stored in the ASR model storage 452. Feature vectors of the audio data 211 may arrive at the system 120 encoded, in which case they may be decoded prior to processing by the speech recognition engine 458.

Figure 5:
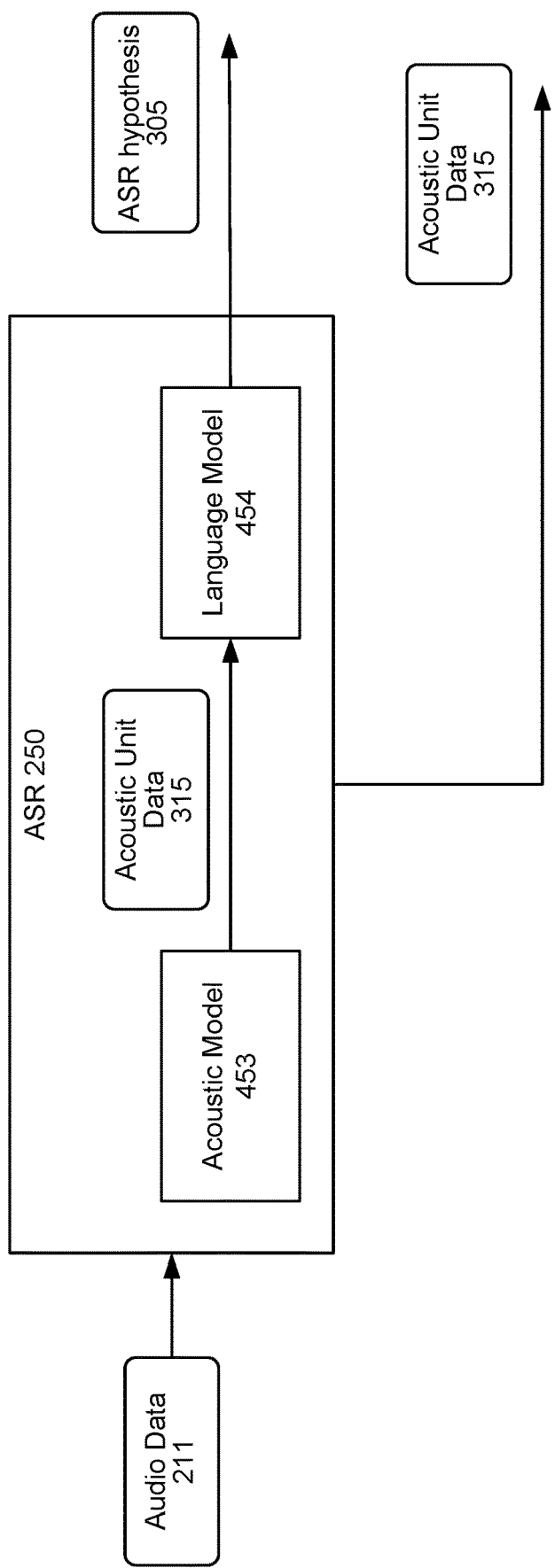
FIG. 5 is a conceptual diagram showing ASR processing in an ASR component, according to embodiments of the present disclosure.

FIG. 5 is a conceptual diagram showing ASR processing in an ASR component 250, according to embodiments of the present disclosure. The speech recognition engine 458 attempts to match received feature vectors to language acoustic units (e.g., phonemes) and words as known in the stored acoustic models 453, language models 454, and FST(s) 455. For example, as illustrated in FIG. 5, the audio data 211 may be processed by one or more acoustic model(s) 453 to determine acoustic unit data 315. The acoustic unit data 315 may include indicators of acoustic units detected in the audio data 211 by the ASR 250. For example, acoustic units can consist of one or more of phonemes, diaphonemes, tonemes, phones, diphones, triphones, or the like. The acoustic unit data 315 can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data 315 may be processed using the language model 454 (and/or using FST 455) to determine text data/ASR hypothesis 305. The ASR hypothesis 305 may then be sent to further components (such as NLU 260) for further processing as discussed herein. Further, the acoustic unit data 315 may also be sent to further components for further processing; for example, the NLU component 260 for performing entity resolution as described herein. The acoustic unit data 315 output by the ASR 250 may be output after processing using the acoustic model 453 or may be output after processing by the language model 454, particularly as operations using the language model 454 may involve certain pruning/re-ranking/other operations that may result in a more useful set of acoustic unit data 315 for downstream purposes (such as entity resolution as noted herein).

The speech recognition engine 458 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 458 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 458 may use the acoustic model(s) 453 to attempt to match received audio feature vectors to words or subword acoustic units. An acoustic unit may be a senone, phoneme, phoneme in context, syllable, part of a syllable, syllable in context, or any other such portion of a word. The speech recognition engine 458 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 458 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 458, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 458 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 6:
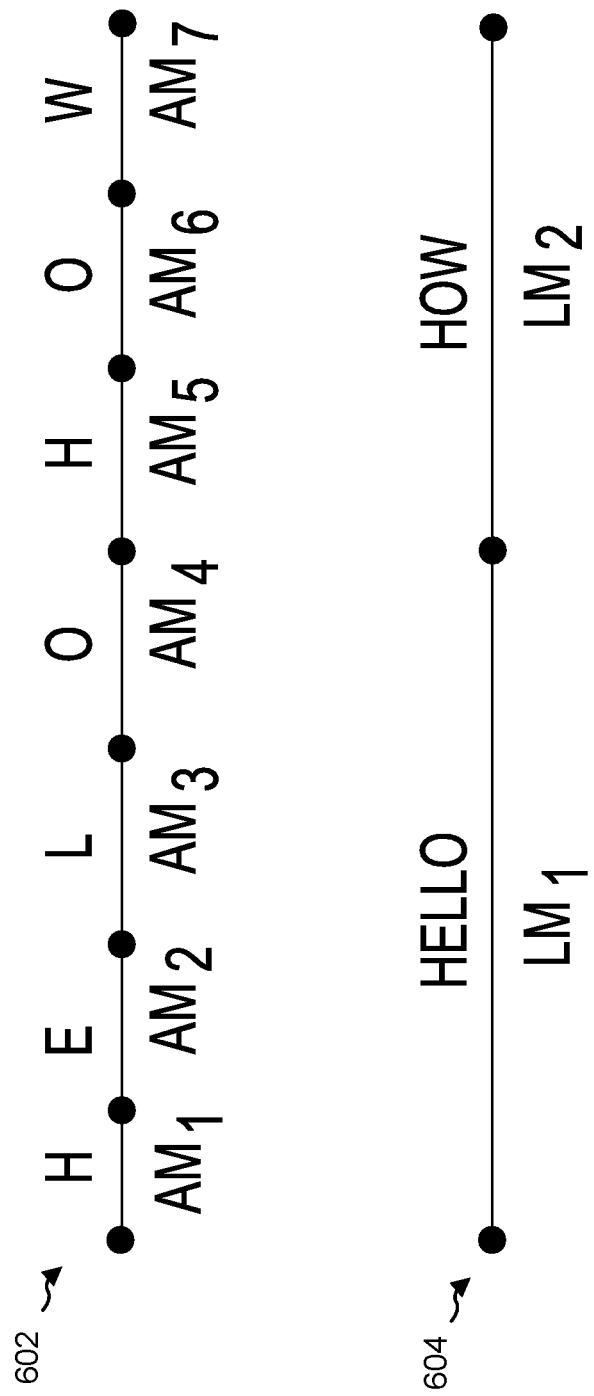
FIG. 6 illustrates phoneme processing and word processing according to one aspect of the present disclosure.

FIG. 6 illustrates the relationship between acoustic modeling and language modeling. As illustrated, each processed phoneme included in the path 602 is associated with an acoustic model score AM1 through AM7. The language model is then applied to associate each word in the path 604 with a language model score LM1 or LM2.

As part of the language modeling (or in other phases of the ASR processing) the speech recognition engine 458 may, to save computational resources, prune and discard low recognition score states or paths that have little likelihood of corresponding to the spoken utterance, either due to low recognition score pursuant to the language model, or for other reasons. Such pruned paths/hypotheses are considered inactive. Active hypotheses are hypotheses that are still under consideration by the speech recognition engine 458. Thus, active hypotheses may have a confidence score that is above a certain threshold as they have thus far avoided pruning. As ASR processing continues, at different points in the ASR processing different hypotheses may be considered "active" as other hypotheses are added and/or removed from active consideration based on incoming audio data and acoustic model processing. Further, during the ASR processing the speech recognition engine 258 may iteratively perform additional processing passes on previously processed utterance portions. Later passes may incorporate results of earlier passes to refine and improve results. Paths which are being currently processed and considered as a potential output of the system are thus considered active hypotheses.

Figure 7:
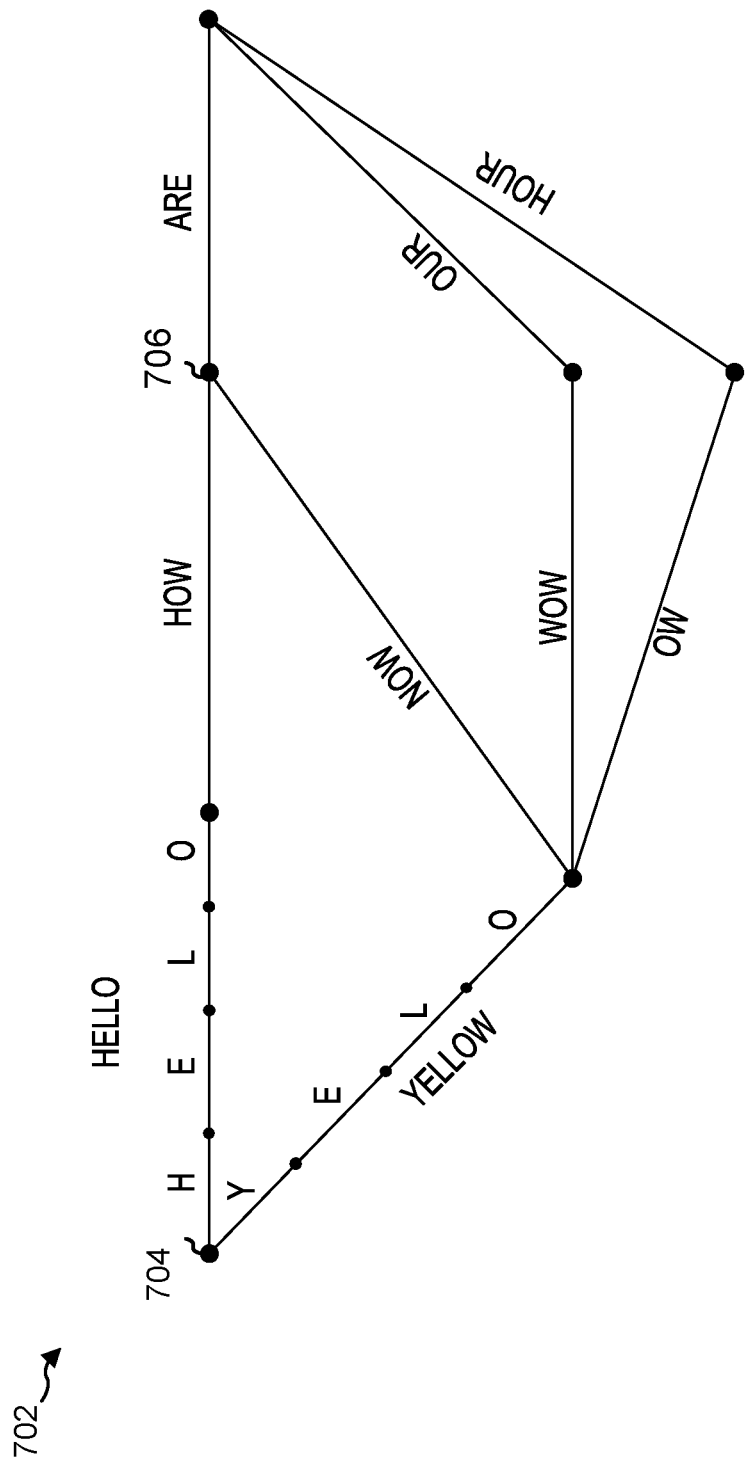
FIG. 7 illustrates a speech recognition lattice according to one aspect of the present disclosure.

FIG. 7 illustrates a speech recognition lattice 702 according to one aspect of the present disclosure. The speech recognition engine 458 may combine potential paths into a lattice representing speech recognition results. A sample lattice is shown in FIG. 7. The lattice 702 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 704 and node 706 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 258 as the ASR result for the associated feature vectors.

Figure 9:
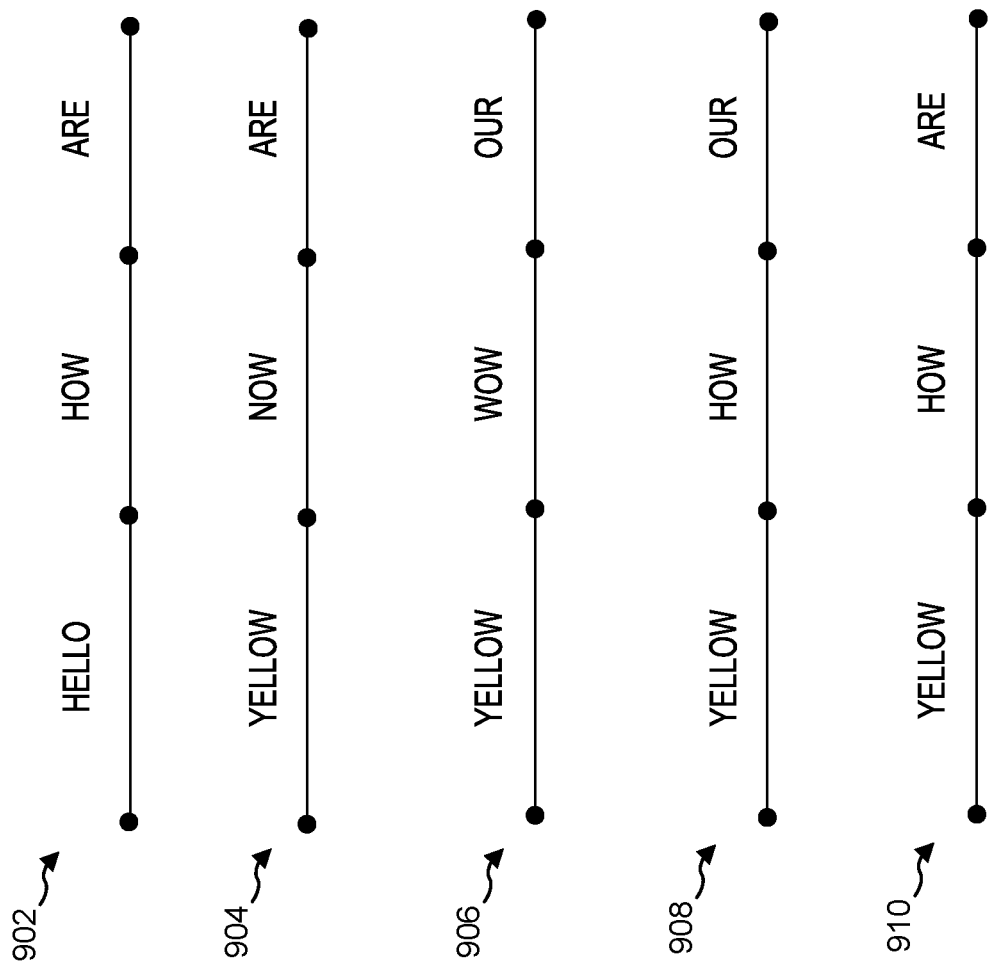
FIG. 9 illustrates a number of hypotheses associated with the lattice of FIG. 7.

FIG. 8 illustrates speech recognition lattices according to one aspect of the present disclosure, and FIG. 9 illustrates a number of hypotheses associated with the lattice of FIG. 7. Illustrated in FIG. 8 are different potential paths 802, 804, and 806 along the lattice 702. As shown in FIG. 8, path 802 results in "hello how are," path 804 results in "yellow now are" and path 806 results in "yellow wow our." As can be seen, many such paths are possible even in the small example lattice 702. An example of such paths 902-910 are shown in FIG. 9. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc.

In another example, the speech recognition engine 458 may receive a series of feature vectors for sound corresponding to a user saying "There is a bat in my car." The speech recognition engine 458 may attempt to match each feature vector with an acoustic unit, such as a phoneme. As new feature vectors are processed, the speech recognition engine 458 may determine state transitions (for example, using HMMs) to determine whether a probability of whether a state should either remain the same, or change to a new state (i.e., whether an incoming feature vector results in a state transition from one phoneme to another). As the processing continues, the speech recognition engine 458 continues calculating such state transition probabilities. After processing one feature vector, the speech recognition engine 458 may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the speech recognition engine 458 may also calculate potential states for other phonemes. In this manner multiple states and state transition probabilities may be calculated.

The probable states and probable state transitions calculated by the speech recognition engine 458 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score, or probabilities may be converted to the log domain and added to assist processing.

The speech recognition engine 458 may also compute scores of branches of the paths based on language models or grammars. Language modeling involves determining scores for what words are likely to be used together to form coherent words and sentences. Application of a language model 454 may improve the likelihood that the ASR component 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken natural language input. The language modeling may be determined from a text corpus and may be customized for particular applications.

As the speech recognition engine 458 determines potential words from the input audio data, the lattice may become very large as many potential sounds and words are considered as potential matches for the input audio data. The potential matches may be illustrated as a word result network representing possible sequences of words that may be recognized and the likelihood of each sequence.

Figure 10:
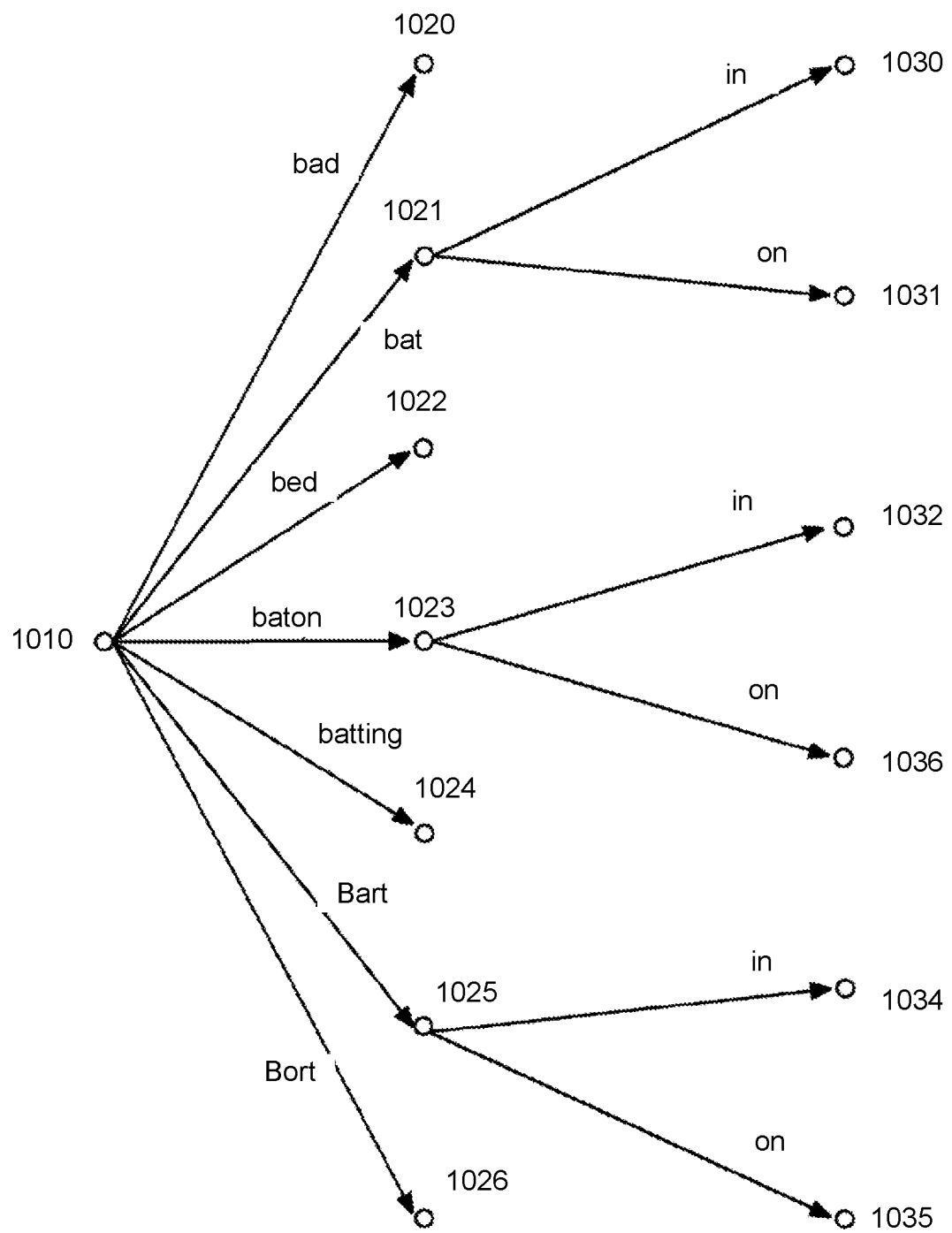
FIG. 10 illustrates a word result network, according to embodiments of the present disclosure.

FIG. 10 illustrates a word result network, according to embodiments of the present disclosure. FIG. 10 shows an example of a word result network that may be used by the speech recognition engine 458 for recognizing speech according to some aspects of the present disclosure. A word result network may consist of sequences of words that may be recognized and the likelihood of each sequence. The likelihood of any path in the word result network may be determined by an acoustic model 453 and a language model 454. In FIG. 10, the paths shown include, for example, "bad", "bat in", "bat on", "bed", "baton in", "baton on", "batting", "Bart in", "Bart on", and "Bort".

As illustrated in FIG. 10, a word result network may start at initial node 1010. At node 1010, no words may have been recognized yet as the speech recognition engine 458 commences its processing. From node 1010, the speech recognition engine 458 may create arcs and additional nodes where each arc may be associated with a potential word that may be recognized. In some applications, words may be represented by nodes instead of arcs. In FIG. 10, arcs from node 1010 to nodes 1020 to 1026 are labeled with example words that may be recognized by the speech recognition engine 458.

From initial node 1010, the speech recognition engine 458 may apply acoustic models 453 and language models 454 to determine which of the arcs leaving node 1010 are most likely to occur. For an acoustic model 453 employing HMIs, the speech recognition engine 458 may create a separate HMM for each arc leaving node 1010. Applying the acoustic model 453 and language model 454, the speech recognition engine 458 may decide to pursue some subset of the arcs leaving node 1010. For example, in FIG. 10, the speech recognition engine 458 may decide to follow the paths starting with "bad", "bat", and "bed" and may decide to stop pursuing the paths starting with "baton", "batting", "Bart," and "Bort" based on the respective scores of those arcs, with the speech recognition engine 458 pursuing only the higher scoring arcs in an effort to concentrate computing resources on the arcs most likely to result in a correct result.

The speech recognition engine 458 may return an N-best list of paths along with their respective recognition scores, corresponding to the top N paths as determined by the speech recognition engine 458. Each path may correspond to a different ASR hypothesis.

Referring back to FIG. 2, the device 110b may receive a typed natural language input. The device 110b may generate text data 213 representing the typed natural language input. The device 110b may send the text data 213 to the system 120, where the text data 213 is received by the orchestrator component 230.

The orchestrator component 230 may send text data (e.g., one or more ASR hypotheses 305 output by the ASR component 250, or the received text data 213) as well as acoustic data (e.g., acoustic unit data 315 output by the ASR component 250) to an NLU component 260 for NLU processing.

The orchestrator component 230 may send the ASR hypothesis 305 and the acoustic unit data 315 to the NLU component 260. The NLU component 260 may perform natural language processing (as described below) with respect to the acoustic unit data 315, the ASR hypothesis 305, and/or the other ASR hypothesis(es). The NLU component 260 may rank NLU hypotheses generated thereby. One skilled in the art will thus appreciated that, when the NLU component 260 processes with respect to the acoustic unit data 315, the ASR hypothesis 305, and any other ASR hypothesis(es), respective NLU hypotheses may be generated, and the NLU component 260 may select a best of the generated NLU hypotheses for further processing. In some implementations, the NLU component 260 may use the acoustic unit data 315 only if certain conditions are or are not met; for example, the NLU component 260 may use the acoustic unit data 315 in generating NLU results data 1285 if a confidence score related to an ASR hypothesis 305 fails to meet a threshold level. Operation of the NLU component 260 is described further below with reference to FIGS. 11 and 12.

Figure 11:
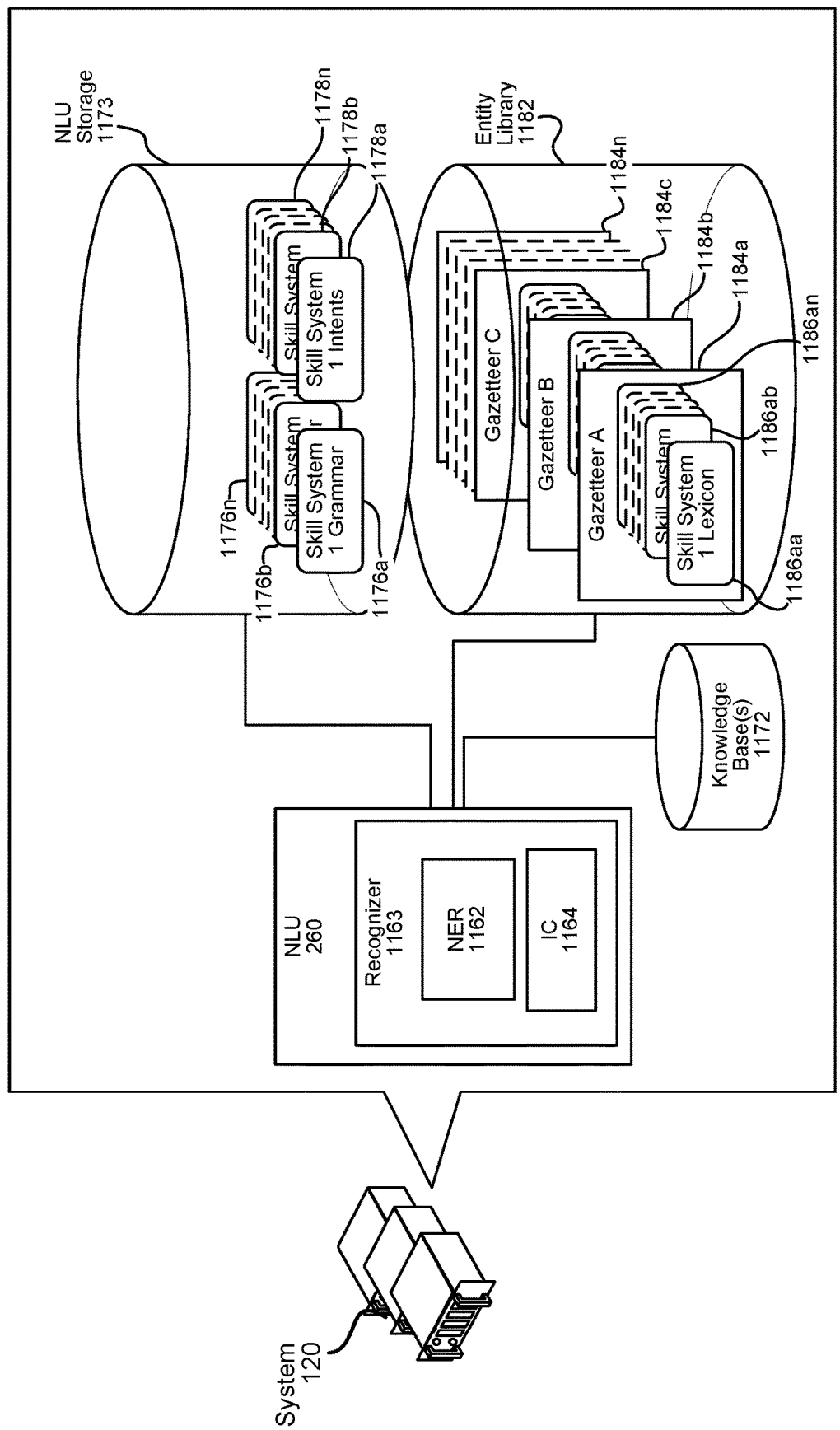
FIG. 11 is a conceptual diagram of how natural language processing is performed, according to embodiments of the present disclosure.
Figure 12:
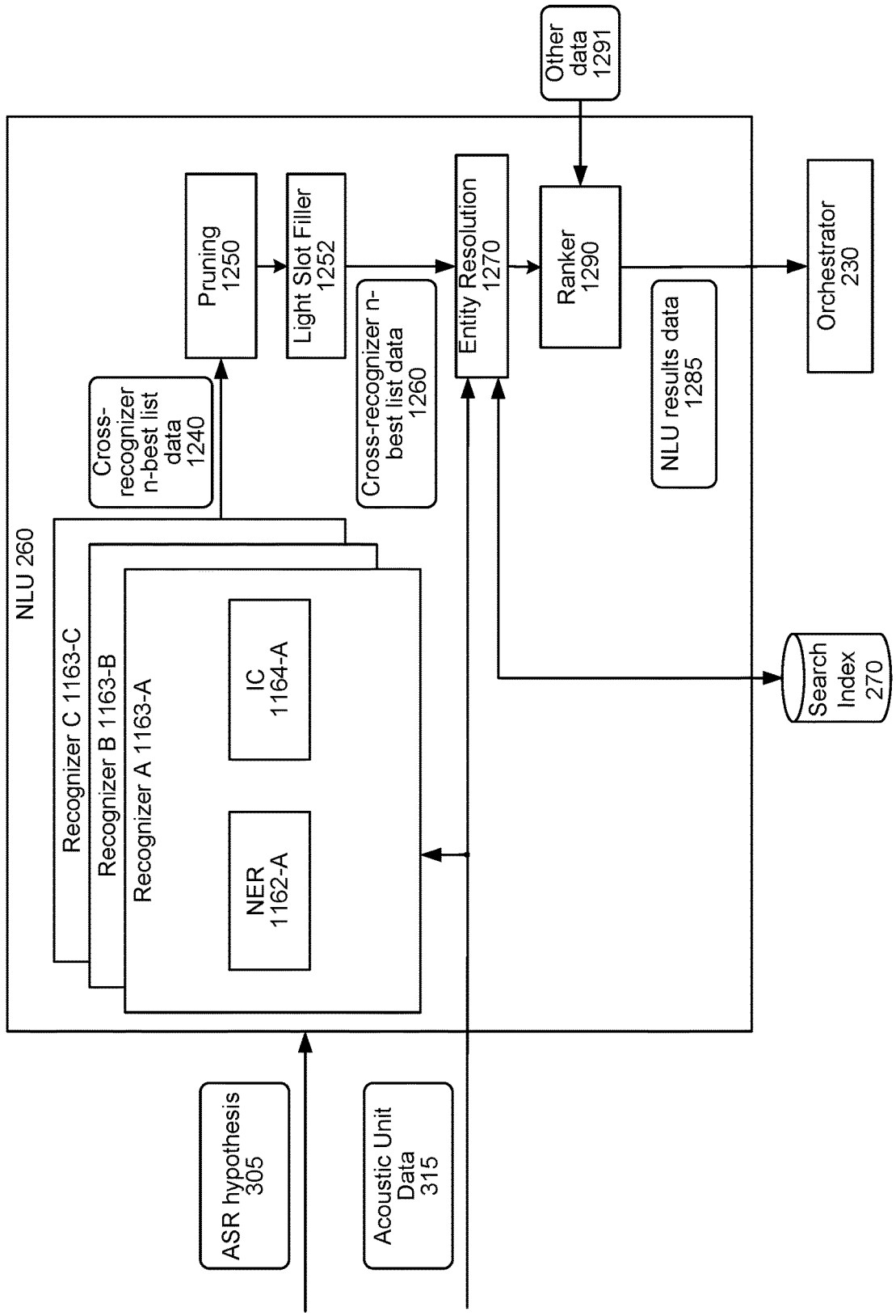
FIG. 12 is a conceptual diagram of how natural language processing is performed, according to embodiments of the present disclosure.

FIGS. 11 and 12 are conceptual diagrams showing how the NLU component 260 may perform NLU processing, according to embodiments of the present disclosure. The NLU component 260 may include one or more recognizers 1163. In at least some embodiments, a recognizer 1163 may be associated with a skill system 125 (e.g., the recognizer may be configured to interpret text data to correspond to the skill system 125). In at least some other examples, a recognizer 1163 may be associated with a domain (i.e., the recognizer may be configured to interpret text data to correspond to the domain). The recognizer 1163 can serve as a search provider interface to the skills and/or domains such as a music domain.

Recognizers 1163 may process text data in parallel, in series, partially in parallel, etc. For example, a recognizer corresponding to a first domain may process text data at least partially in parallel to a recognizer corresponding to a second domain. For further example, a recognizer corresponding to a first skill system may process text data at least partially in parallel to a recognizer corresponding to a second skill system. Thus, the system 100 can fan out searches related to entity recognition and resolution across the recognizers 1163.

The NLU component 260 may communicate with various storages. The NLU component 260 may communicate with an NLU storage 1173, which includes skill system grammars (1176*a*-1176*n*), representing how natural language inputs may be formulated to invoke skill systems 125, and skill system intents (1178*a*-1178*n*) representing intents supported by respective skill systems 125.

Each recognizer 1163 may be associated with a particular grammar 1176, a particular intent(s) 1178, and a particular personalized lexicon 1186 (stored in an entity library 1182). A gazetteer 1184 may include skill system-indexed lexical information associated with a particular user. For example, Gazetteer A (1184*a*) may include skill system-indexed lexical information 1186*aa* to 1186*an*. A user's music skill system lexical information might include album titles, artist names, and song names, for example, whereas a user's contact list skill system lexical information might include the names of contacts. Since every user's music collection and contact list is presumably different, this personalized information may improve entity resolution.

Each recognizer 1163 may include a named entity recognition (NER) component 1162 that attempts to identify grammars and lexical information that may be used to construe meaning with respect to text data input therein. A NER component 1162 identifies portions of text data that correspond to a named entity that may be recognizable by the system 120. A NER component 1162 may also determine whether a word refers to an entity that is not explicitly mentioned in the text, for example "him," "her," "it" or other anaphora, exophora or the like.

A NER component 1162 applies grammar models 1176 and lexical information 1186 associated with one or more skill systems 125 to determine a mention of one or more entities in text data input therein. In this manner, a NER component 1162 identifies "slots" (i.e., particular words in text data) that may be needed for later processing. A NER component 1162 may also label each slot with a type (e.g., noun, place, city, artist name, song name, etc.).

Each grammar model 1176 may include the names of entities (i.e., nouns) commonly found in speech about a particular skill system 125 to which the grammar model 1176 relates, whereas lexical information 1186 may be personalized to the user identifier output by a user recognition component 295 (described herein with reference to FIG. 2) for the natural language input. For example, a grammar model 1176 associated with a shopping skill system may include a database of words commonly used when people discuss shopping.

A downstream process called entity resolution 1270 actually links a portion of text data (identified by a NER component 1162) to a specific entity known to the system 120. To perform entity resolution, the NLU component 260 may use gazetteer information (1184*a*-1184*n*) stored in the entity library storage 1182. The gazetteer information 1184 may be used to match text data (identified by a NER component 1162) with different entities, such as song titles, contact names, etc. Gazetteers may be linked to users (e.g., a particular gazetteer may be associated with a specific user's music collection), may be linked to certain skill systems 125 (e.g., a shopping skill system, a music skill system, a video skill system, a communications skill system, etc.), or may be organized in another manner. The recognizers 1163 can receive acoustic unit data 315 from the ASR component 250 in addition to the ASR hypotheses 305 received. In addition, the recognizers 1163 may receive other information from the upstream components including, for example, utterance ID, customer ID, and/or location information to allow user profile personalization and local search results.

Each recognizer 1163 may also include an IC component 1164 that processes text data input thereto to determine an intent(s) of a skill system(s) 125 that potentially corresponds to the natural language input represented in the text data. An intent corresponds to an action to be performed that is responsive to the natural language input represented by the text data. An IC component 1164 may communicate with a database 1178 of words linked to intents. For example, a music intent database may link words and phrases such as "quiet," "volume off," and "mute" to a <Mute> intent. An IC component 1164 identifies potential intents by comparing words and phrases in text data to the words and phrases in an intents database 1178 associated with the skill system(s) 125 that is associated with the recognizer 1163 implementing the IC component 1164.

The intents identifiable by a specific IC component 1164 may be linked to one or more skill system-specific grammar models 1176 with "slots" to be filled. Each slot of a grammar model 1176 corresponds to a portion of text data that a NER component 1162 believes corresponds to an entity. For example, a grammar models 1176 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar models 1176 may not be structured as sentences, but rather based on associating slots with grammatical tags.

For example, a NER component 1162 may identify words in text data as subject, object, verb, preposition, etc. based on grammar rules and/or models prior to recognizing named entities in the text data. An IC component 1164 (implemented by the same recognizer 1163) may use the identified verb to identify an intent. The NER component 1162 may then determine a grammar model 1176 associated with the identified intent. For example, a grammar model 1176 for an intent corresponding to <PlayMusic> may specify a list of slots applicable to play the identified "object" and any object modifier (e.g., a prepositional phrase), such as {Artist Name}, {Album Name}, {Song name}, etc. The NER component 1162 may then search corresponding fields in a lexicon 1186, attempting to match words and phrases in the text data the NER component 1162 previously tagged as a grammatical object or object modifier with those identified in the lexicon 1186.

A NER component 1162 may perform semantic tagging, which is the labeling of a word or combination of words according to their type/semantic meaning. A NER component 1162 may parse text data using heuristic grammar rules, or a model may be constructed using techniques such as hidden Markov models, maximum entropy models, log linear models, conditional random fields (CRF), and the like. For example, a NER component 1162, implemented by a music skill system or music domain recognizer 1163, may parse and tag text data corresponding to "play mother's little helper by the rolling stones" as {Verb}: "Play," {Object}: "mother's little helper," {Object Preposition}: "by," and {Object Modifier}: "the rolling stones." The NER component 1162 may identify "Play" as a verb based on a word database associated with the music skill system or music domain, which an IC component 1164 may determine corresponds to a <PlayMusic> intent. At this stage, no determination has been made as to the meaning of "mother's little helper" and "the rolling stones," but based on grammar rules and models, the NER component 1162 has determined that the text of these phrases relates to the grammatical object (i.e., entity).

The frameworks linked to the intent are then used to determine what database fields should be searched to determine the meaning of these phrases, such as searching a user's gazetteer 1184 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 1184 does not resolve a slot/field using gazetteer information, the NER component 1162 may search a database of generic words (in the knowledge base 1172). For example, if the text data corresponds to "play songs by the rolling stones," after failing to determine an album name or song name called "songs" by "the rolling stones," the NER component 1162 may search a music skill system vocabulary for the word "songs." In the alternative, generic words may be checked before the gazetteer information, or both may be tried, potentially producing two different results.

A recognizer 1163 may tag text data to attribute meaning thereto. For example, a recognizer 1163 may tag "play mother's little helper by the rolling stones" as: {skill system} Music, {intent} Play Music, {artist name} rolling stones, {media type} SONG, and {song title} mother's little helper. For further example, a recognizer 1163 may tag "play songs by the rolling stones" as: {skill system} Music, {intent} Play Music, {artist name} rolling stones, and {media type} SONG.

As described above, more than one recognizer 1163 may process with respect to text data representing a single natural language input. In such instances, each recognizer 1163 may output at least one NLU hypothesis including an intent indicator (determined by an IC component 1164 of the recognizer 1163) and at least one tagged named entity (determined by a NER component 1162 of the recognizer 1163).

The NLU component 260 may compile the NLU hypotheses (output by multiple recognizers 1163) into cross-recognizer N-best list data 1240. Each NLU hypothesis may be associated with a respective score indicating a likelihood that the NLU hypothesis corresponds to the domain, one or more skill systems 125, etc. associated with the recognizer 1163 from which the NLU hypothesis was output. For example, the cross-recognizer N-best list data 1240 may be represented as:

[0.95] Intent: <PlayMusic> ArtistName: Lady Gaga SongName: Poker Face
[0.70] Intent: <PlayVideo> ArtistName: Lady Gaga VideoName: Poker Face
[0.01] Intent: <PlayMusic> ArtistName: Lady Gaga AlbumName: Poker Face
[0.01] Intent: <PlayMusic> SongName: Pokerface with each line of the foregoing corresponding to a different NLU hypothesis and associated score.

The NLU component 260 may send the cross-recognizer N-best list data 1240 to a pruning component 1250, which sorts the NLU hypotheses, represented in the cross-recognizer N-best list data 1240, according to their respective scores. The pruning component 1250 may then perform score thresholding with respect to the cross-recognizer N-best list data 1240. For example, the pruning component 1250 may select NLU hypotheses, represented in the cross-recognizer N-best list data 1240, associated with scores satisfying (e.g., meeting and/or exceeding) a threshold score. The pruning component 1250 may additionally or alternatively perform number of NLU hypothesis thresholding. For example, the pruning component 1250 may select a threshold number of top-scoring NLU hypotheses represented in the cross-recognizer N-best list data 1240.

The pruning component 1250 may generate cross-recognizer N-best list data 1260 including the selected NLU hypotheses. The purpose of the pruning component 1250 is to create a reduced list of NLU hypotheses so that downstream, more resource intensive, processes may only operate on NLU hypotheses that most likely represent the natural language input.

The NLU component 260 may include a light slot filler component 1252 that takes text from slots, represented in the NLU hypotheses output by the pruning component 1250, and alter it to make the text more easily processed by downstream components. The light slot filler component 1252 may perform low latency operations that do not involve heavy operations such as reference to a knowledge base. The purpose of the light slot filler component 1252 is to replace words with other words or values that may be more easily understood by downstream components. For example, if a NLU hypothesis includes the word "tomorrow," the light slot filler component 1252 may replace the word "tomorrow" with an actual date for purposes of downstream processing. Similarly, the light slot filler component 1252 may replace the word "CD" with "album" or the words "compact disc." The replaced words are then included in the cross-recognizer N-best list data 1260.

The cross-recognizer N-best list data 1260 may be sent to an entity resolution component 1270. Although illustrated as part of NLU 260, the entity resolution component 1270 may be configured such that it is external to NLU 260 and may communicate with other components (such as Orchestrator 230 and/or others) without necessarily invoking NLU 260. Entity resolution component 1270 may operate as described herein regardless of its configuration with regard to NLU 260. The entity resolution component 1270 can apply rules or other instructions to standardize labels or tokens in the NLU hypotheses represented in the cross-recognizer N-best list data 1260. The precise transformation may depend on the skill system 125, domain, etc. to which a NLU hypothesis relates. For example, for a travel skill system-specific NLU hypothesis, the entity resolution component 1270 may transform text corresponding to "Boston airport" to the standard BOS three-letter code referring to the airport. The entity resolution component 1270 can refer to a knowledge base that is used to specifically identify the precise entity referred to in each slot of each NLU hypothesis represented in the cross-recognizer N-best list data 1260.

Specific intent/slot combinations may also be tied to a particular source, which may then be used to resolve the text. In the example "play songs by the stones," the entity resolution component 1270 may reference a personal music catalog, Amazon Music account, a user profile, or the like. The entity resolution component 1270 may output N-best list data, altered from the cross-recognizer N-best list data 1260, that includes more detailed information (e.g., entity IDs) about the specific entities mentioned in the slots and/or more detailed slot data that can eventually be used by a skill system 125 to perform an action responsive to the natural language input. The NLU component 260 may include multiple entity resolution components 1270 that are each specific to one or more different skill systems 125, domains, etc.

The entity resolution component 1270 may not be successful in resolving every entity and filling every slot represented in the NLU hypotheses represented in the cross-recognizer N-best list data 1260. This may result in the entity resolution component 1270 outputting incomplete or erroneous results. For example, and as described previously, homographs may introduce ambiguity into entity resolution—that is, two different spoken words with different pronunciation and meaning may be represented by the same textual output of the ASR component 250. In such cases, the acoustic unit data may more accurately represent the expectation of the user 5. Thus, the entity resolution component 1270 can leverage the unit data 315 from the ASR component 250 in resolving the entity.

To resolve the entity in the slot question, the entity resolver component 1270 can search the joint lexical/phonetic search index 270 based on a combination of phonetic data and/or lexical data associated with the slot. The entity resolver component 1270 can receive phonetic results and/or lexical results from the search index 270 in response to the search query, where the phonetic results represent entities potentially represented by the phonetic data, and the lexical results represent entities potentially represented by the lexical data. The search index 270 can include both lexical entries—that is, a list of text character sequences and their corresponding entities—and phonetic entries—that is, a list of phone or phoneme sequences and their corresponding entities. The phonetic entries can be expressed as a series of one or more symbols of a phonetic alphabet, such as X-SAMPA, the International Phonetic Alphabet, or the Initial Teaching Alphabet (ITA). The phonetic entries can be generated by applying a grapheme-to-phoneme (G2P) model on lexical entries. The search index 270 may include multiple lexical entries for a single entity if a word representing the entity has more than one spelling (e.g., "canceled" versus "cancelled"). Similarly, the search index 270 may include multiple phonetic entries for a single entity if a word representing the entity has more than one pronunciation; for example, in the International Phonetic Alphabet, "aunt" may be represented as ant or änt, "either" as ʻēTHə r or ʻīTHə r, and "envelope" as ʻenvə ,lōp or ʻänvə ,lōp. Thus, searching the search index 270 using acoustic unit data representing any known pronunciation of a word should return a phonetic result for the correct word. The entity resolver component 1270 can receive phonemes corresponding to the ASR transcription as aligned with the NER mention and the ASR confidence as well as the ASR alphabet and version used for phonemes. The search index 270 can return, for each query, a combination of lexical and/or phonetic matches.

The system may use time data such as audio frame data or other information to track which acoustic units of the acoustic unit data 315 go with which portions of the audio data 211 and/or which portions of the ASR hypothesis 305 (e.g., text data). For example, the system may determine which portion of the ASR hypothesis corresponds to a potential entity (for example a portion of text data identified by the NER component 1162) and using that portion of text, time data, etc. may identify the audio frames and/or the acoustic units that match that portion of text so the correct acoustic unit data 315 may be used by the entity resolution component 1270.

In some implementations, ingestion of phonetic entries—e.g., phonemes—into the search index 270 can be accomplished using a grapheme-to-phoneme (G2P) model used for ASR. A phoneme is defined as a unit of sound that distinguishes one work from another in a particular language, and a grapheme is defined as the smallest unit of a writing system of any given language. A grapheme alone may or may not carry meaning by itself and may or may not correspond to a single phoneme of the spoken language. The G2P model generates one or more pronunciations for each grapheme. Based on the phonemes output by the G2P model, the ASR component 250 can match acoustic units to the phonemes for determining one or more corresponding graphemes, thus generating text data corresponding to the acoustic units. Ingestion of pronunciations into the search index 270 can also be accomplished by applying the G2P model to the lexical entries of the search index 270 to generate phonetic entries. The G2P model can, where appropriate, generate multiple pronunciations for a given grapheme or series of graphemes. In some implementations, the G2P model can generate an n-best list: 1-5 best phoneme representations, which we store inside of the search index 270. In some implementations, the G2P model can include rules created by an automated statistical analysis of a pronunciation dictionary. In some implementations, probability information related to different pronunciations is carried through to the search index 270 such that, for words having multiple pronunciations, the search index 270 can yield an n-best list, with each item in the list having an associated probability or confidence value. Conversely, for multiple words having similar pronunciations, the search index 270 may maintain confidence values for the probability of a certain pronunciation corresponding to each possible word.

In some implementations, the entity resolution component 1270 can receive additional information from the upstream systems. For example, the entity resolution component 1270 may receive information such as utterance ID, customer ID, and/or location information to allow user profile personalization and local search results. Other information can include inverse text normalization to facilitate other transcription issues such as "U2" versus "you, too."

In some implementations, the entity resolution component 1270 can search the search index 270 for every slot data to be resolved. In some implementations, the entity resolution component 1270 may only search the search index 270 when a confidence score for entities in the n-best list are below a threshold level.

The entity resolution component 1270 and search index 270 can be generated by applying machine learning to a training data set, where the training set includes both lexical and phonetic information. A signal can be applied to, or derived from, the training data to indicate whether a particular interaction resulted in a positive or negative outcome. For example, for a music domain search, an interaction can be designated as positive if playback is allowed to continue uninterrupted for an arbitrary duration of time such as 30 second, 60 seconds, the entire song, etc. For a shopping domain, an interaction can be designated as positive if the user confirms purchase of the first-returned item.

One or more models for the entity resolution component 1270 and the search index 270 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning component requires establishing a "ground truth" for training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

In some implementations, the entity resolver component 1270 can weight lexical and phonetic matches differently. For example, the entity resolver component 1270 may apply a boosted weight value to lexical or phonetic matches to give preference to the boosted results. Typical boost values may be 5%, 10%, 25%, 50%, etc. Such a weight value may be applied manually, or set by the system during training. In some implementations, the entity resolver component 1270 can factor the ASR confidence into the weighting. For example, if the ASR confidence is relatively high, the entity resolver component 1270 can weight the lexical match higher than a phonetic match, and if the ASR confidence is relatively low, the entity resolver component 1270 can weight the lexical match lower than the phonetic match.

In some implementations, the entity resolver component 1270 and the search index 270 can be further trained to increase recall for partial and near-matches we leverage an n-gram segmentation of the phonetic representation. This can be done by leveraging 4 hyper-parameters on the number of pronunciations to generate per catalog entry, the minimum number of n-gram matches, the n-gram size, and the relative boost value of the phonetic field versus the lexical field. A logistic regression (1) model can be leveraged on extracted features, including both lexical, and phonetic features such as n-grams, and edit distance, between the NER mention and resolved value, with a cutoff value trained to optimize the F1 score, $$\text{probability }(x) = \frac{1}{1 + e^{-(F(X))}} \quad (1)$$

The model can learn the relative importance of phonetic and lexical features through the use of interaction terms and the use of the average ASR token level confidence across the mention using a second order Taylor expansion (2).

$$F(X) = \beta_0 + \Sigma_i \beta_i x_i + \Sigma_{i<j} y_{ij} x_i x_j \quad (2)$$

In some implementations, the entity resolver component 1270 may query separate lexical and phonetic indices; for example, the entity resolver component 1270 could query for lexical matches in a lexical index and query for phonetic matches in a phonetic index, optionally apply a boost value to results from one or the other index, and rank the results appropriately.

The NLU component 260 may include a ranker component 1290 that assigns a particular score to each NLU hypothesis input therein. The score of a particular NLU hypothesis may be affected by whether the NLU hypothesis has unfilled slots. For example, if a first NLU hypothesis includes slots that are all filled/resolved, the ranker component 1290 may assign the first NLU hypothesis a higher score than a second NLU hypothesis including at least one slot that is unfilled/unresolved by the entity resolution component 1270.

The ranker component 1290 may apply re-scoring, biasing, or other techniques. To do so, the ranker component 1290 may consider not only the data output by the entity resolution component 1270, but may also consider other data 1291. The other data 1291 may include a variety of information.

For example, the other data 1291 may include skill system 125 rating or popularity data. For example, if a skill system 125 has a high rating, the ranker component 1290 may increase the score of a NLU hypothesis associated with that skill system 125, and vice versa.

The other data 1291 may additionally or alternatively include information about skill systems 125 that have been enabled by the user that originated the natural language input. For example, the ranker component 1290 may assign higher scores to NLU hypotheses associated with enabled skill systems 125 than NLU hypotheses associated with skill systems 125 that have not been enabled by the user.

The other data 1291 may additionally or alternatively include data indicating system usage history (e.g., specific to the user), such as if the user, that originated the natural language input, regularly invokes a particular skill system 125 or does so at particular times of day. The other data 1291 may additionally or alternatively include data indicating date, time, location, weather, type of device 110, user identifier, context, as well as other information. For example, the ranker component 1290 may consider when any particular skill system 125 is currently active with respect to the present user and/or device 110 (e.g., music being output by the skill system 125, a game being executed by the skill system 125, etc.).

The ranker component 1290 may output NLU results data 1285 including one or more NLU hypotheses. The NLU component 260 may send the NLU results data 1285 to the orchestrator component 230.

The NLU component 260 sends the NLU results data 1285 (discussed below) to the orchestrator component 230. The NLU results data 1285 may include one or more text portions identified as potentially belonging to an entity (e.g., the output of NER 1162), corresponding score(s), one or more indicators of an intent (e.g., the output of IC 1164), corresponding score(s), one or more indicators of an entity (e.g., the output of entity resolution 1270), corresponding score(s), and/or some combination thereof making up an NLU hypothesis. The NLU results data 1285 may also include a plurality of NLU hypotheses and corresponding scores. Although potentially included within NLU results data 1285, the indicator(s) of an entity output by the entity resolution component 1270 may also be sent as data separate from 1285. The orchestrator component 230 may then send a NLU hypothesis to an appropriate skill 290 and/or skill system 125 for processing and execution of a corresponding action. After processing the skill 290/125 may return to the orchestrator 230 output data 310. If called for, the output data 310 (or text data portions thereof) may be sent from the orchestrator 230 to a TTS component 280 for purposes of creating output audio data 320 representing synthesized speech (which in turn represents the content of the output data 310 which should correspond to a response to the original utterance). The system 120 may then cause the output audio data 320 to be returned to device 110 (or to another device) for output of the synthesized speech using the output audio data 320.

The system 120 may include one or more skills 290. A skill may be software running on the system 120 that is akin to a software application running on a traditional computing device. That is, a skill 290 may enable the system 120 to execute user commands involving specific functionality in order to provide data or produce some other requested output. The system 120 may be configured with more than one skill 290. For example, a weather service skill may enable the system 120 to provide weather information, a car service skill may enable the system 120 to book a trip with respect to a taxi or ride sharing service, a restaurant skill may enable the system 120 to order a pizza with respect to the restaurant's online ordering system, etc. A skill 290 may operate in conjunction between the system 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

Additionally or alternatively to being implemented by the system 120, a skill 290 may be implemented by a skill system 125. Such may enable a skill system 125 to execute specific functionality in order to provide data or perform some other action requested by a user.

Skills may be associated with different domains, such as smart home, music, video, flash briefing, shopping, and custom (e.g., skills not associated with any pre-configured domain).

The system 120 may be configured with a single skill 290 dedicated to interacting with more than one skill system 125.

Unless expressly stated otherwise, reference herein to a "skill" may include a skill 290 operated by the system 120 and/or skill operated by a skill system 125. Moreover, the functionality described herein as a skill may be referred to using many different terms, such as an action, bot, app, or the like.

Referring again to FIG. 2, after receiving the NLU results data 1285, the orchestrator component 230 may send the NLU results data 1285 to a skill system 125. The system 120 may communicate with a variety of skill systems 125. A skill system 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 125 may operate in conjunction between the system 120 and other devices, such as the device 110, in order to complete certain functions. Inputs to a skill system 125 may come from speech processing interactions or through other interactions or input sources.

A skill system 125 may be associated with a domain. A non-limiting list of illustrative domains includes a smart home domain, a music domain, a video domain, a flash briefing domain, a shopping domain, and/or a custom domain.

The system 120 may include a TTS component 280. The TTS component 280 may generate audio data (e.g., synthesized speech) from text data using one or more different methods. Text data input to the TTS component 280 may come from a skill system 125, the orchestrator component 230, or another component of the system 100.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to generate audio data including an artificial speech waveform. Parametric synthesis uses a computerized voice generator, sometimes called a vocoder.

The system 120 may include a user recognition component 295. In at least some embodiments, the user recognition component 295 may be implemented as a skill system 125.

The user recognition component 295 may recognize one or more users using various data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the system 120 in correlation with a natural language input, to stored biometric data of users. The user recognition component 295 may additionally or alternatively perform user recognition by comparing image data (e.g., including a representation of at least a feature of a user), received by the system 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110 that captured the natural language input.

The user recognition component 295 determines whether a natural language input originated from a particular user.

For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system 125, as well as processing performed by other components of the system 120 and/or other systems.

In some implementations, however, 295 may be turned off, inactive, or otherwise not engaged to perform user recognition. In such cases, the natural language processing system may assign input audio data to a default account, or a user or group account associated with the device 110, or otherwise determine a user/group account to which to assign incoming data.

The system 120 may include profile storage 275. The profile storage 275 may include a variety of information related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 275 may include one or more user profiles. Each user profile may be associated with a different user identifier. Each user profile may include various user identifying information. Each user profile may also include preferences of the user. Each user profile may include one or more device identifiers, representing one or more devices registered to the user. Each user profile may include identifiers of skill systems 125 that the user has enabled. When a user enables a skill system 125, the user is providing the system 120 with permission to allow the skill system 125 to execute with respect to the user's natural language inputs. If a user does not enable a skill system 125, the system 120 may not invoke the skill system 125 to execute with respect to the user's natural language inputs.

The profile storage 275 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 275 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

Figure 13:
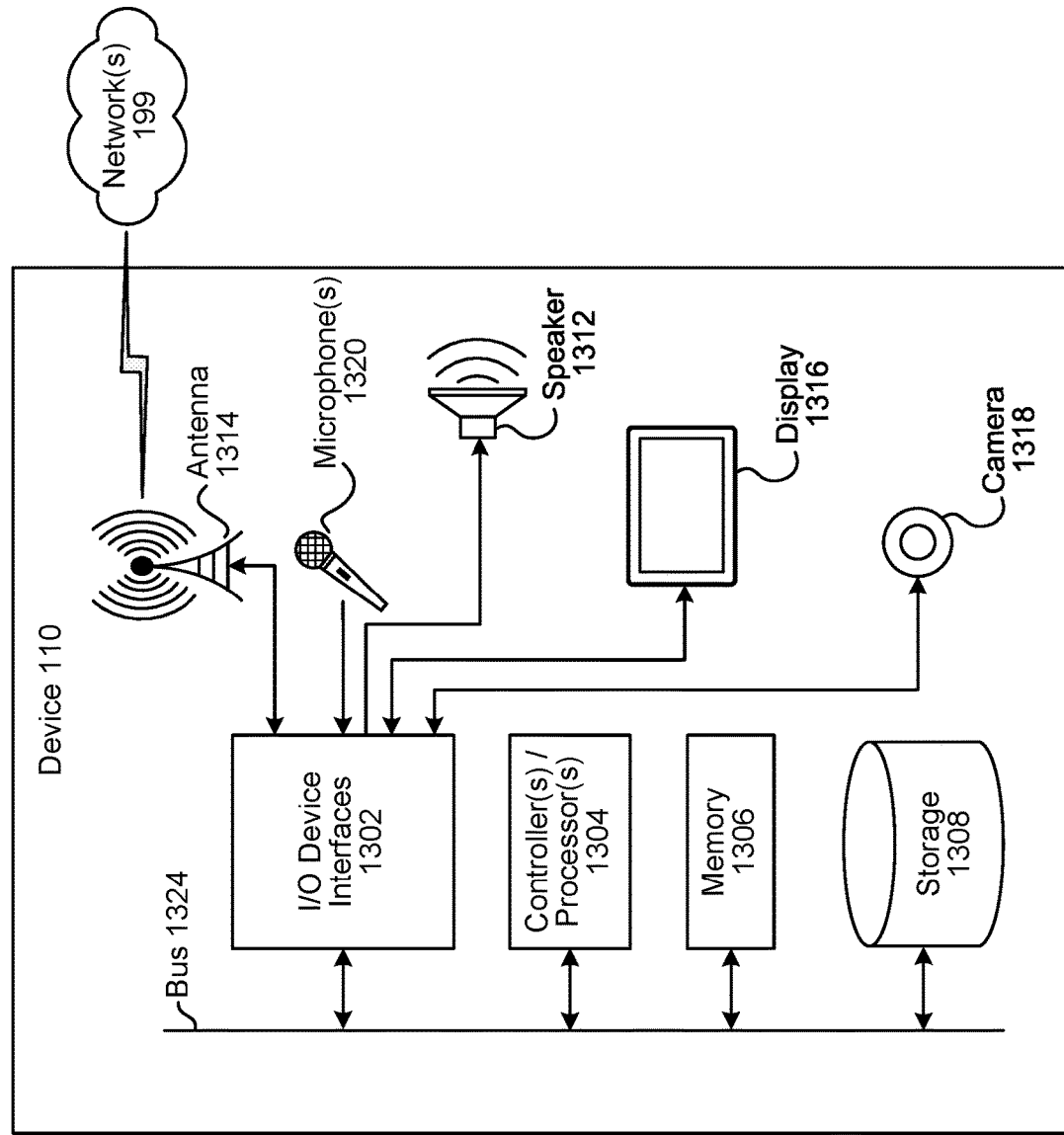
FIG. 13 is a block diagram conceptually illustrating example components of a device, according to embodiments of the present disclosure.
Figure 14:
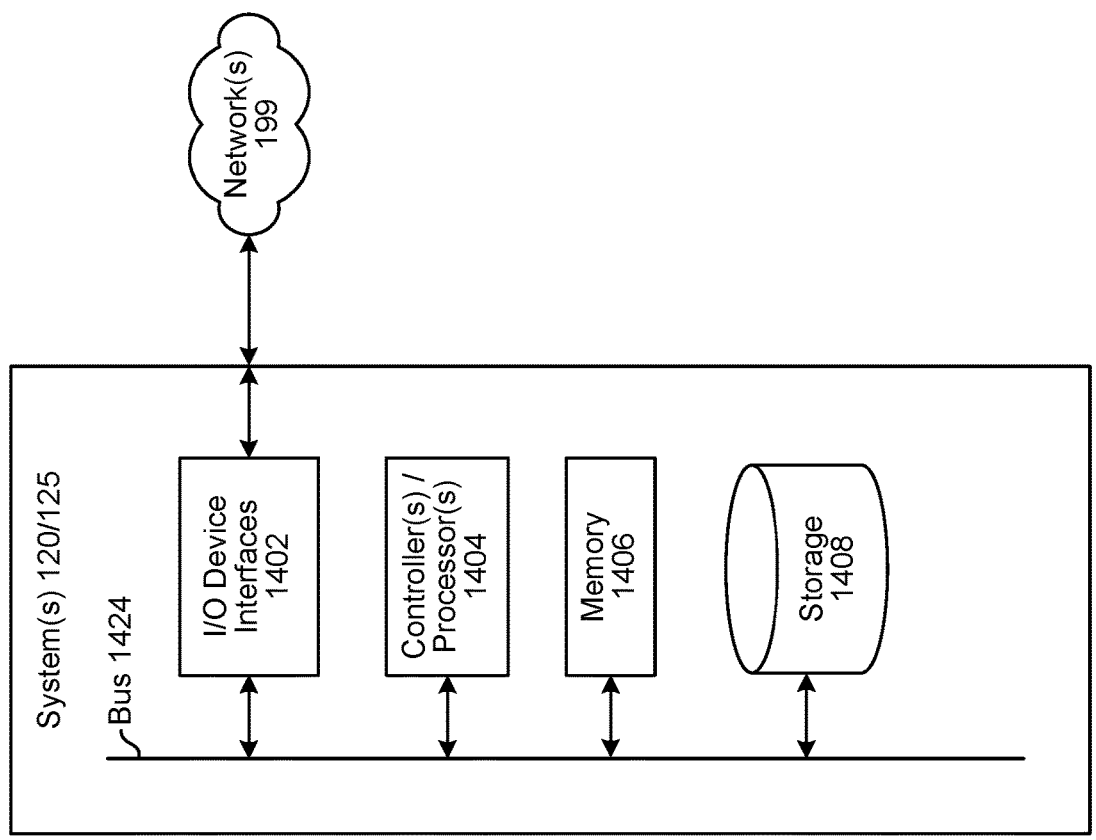
FIG. 14 is a block diagram conceptually illustrating example components of a system, according to embodiments of the present disclosure.

FIG. 13 is a block diagram conceptually illustrating a device 110 that may be used with the system. FIG. 14 is a block diagram conceptually illustrating example components of a remote device, such as the system 120, which may assist with ASR processing, NLU processing, etc.; and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more systems 120 for performing ASR processing, one or more systems 120 for performing NLU processing, and one or more skill systems 125, etc. In operation, each of these systems may include computer-readable and computer-executable instructions that reside on the respective device (120/125), as will be discussed further below.

Each of these devices (110/120/125) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/125) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1302/1402).

Computer instructions for operating each device (110/120/125) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/125) includes input/output device interfaces (1302/1402). A variety of components may be connected through the input/output device interfaces (1302/1402), as will be discussed further below. Additionally, each device (110/120/125) may include an address/data bus (1324/1424) for conveying data among components of the respective device. Each component within a device (110/120/125) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1314, the input/output device interfaces 1302 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device 110, the system 120, and/or a skill system 125 may include their own dedicated processors, memory, and/or storage. Alternatively, one or more of the components of the device 110, the system 120, and/or a skill system 125 may utilize the I/O interfaces (1302/1402), processor(s) (1304/1404), memory (1306/1406), and/or storage (1308/1408) of the device(s) 110, system 120, or the skill system 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 125, as described herein, are illustrative, and may be located as a stand-alone device or may be included, in whole or in part, as a component of a larger device or system.

Figure 15:
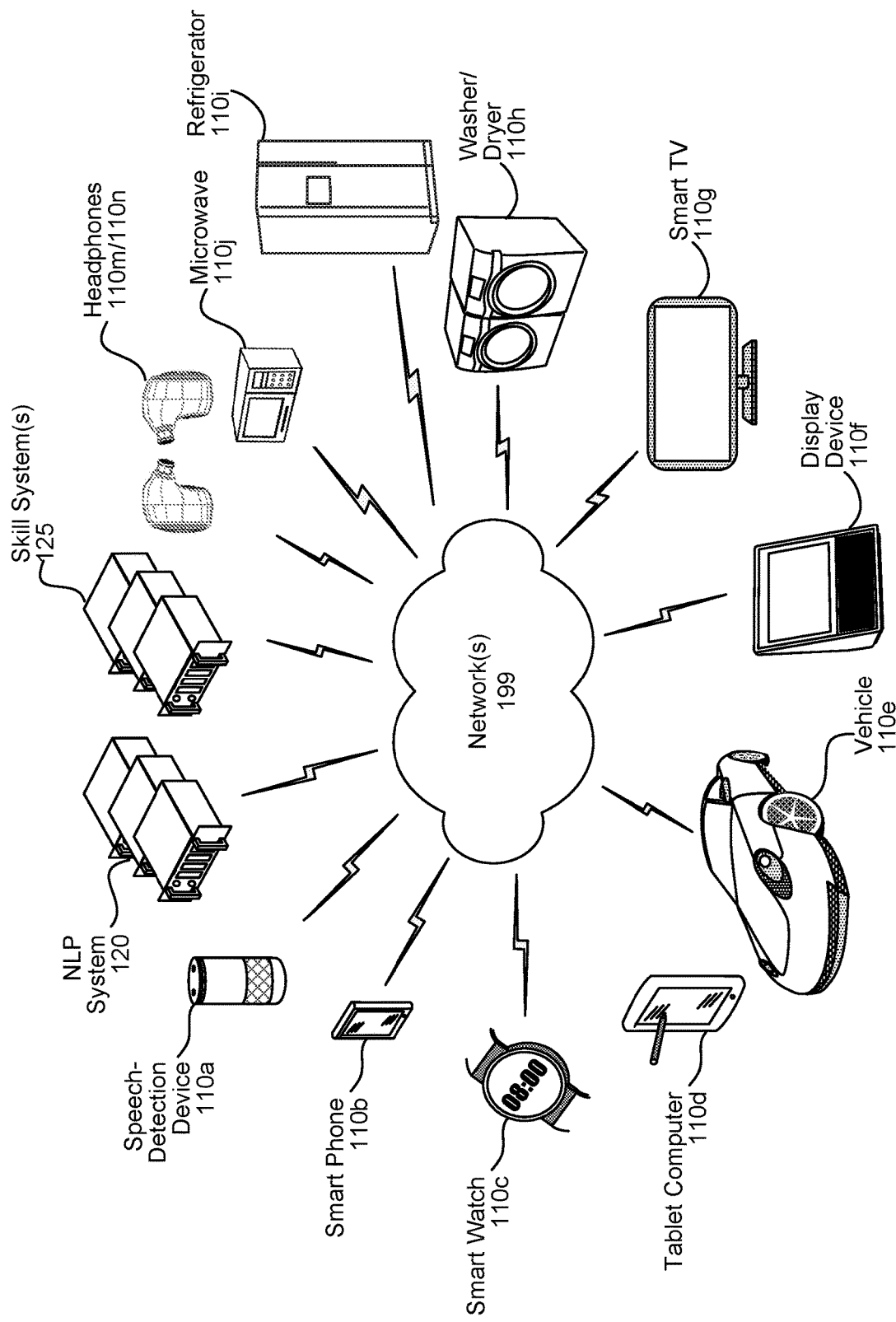
FIG. 15 illustrates an example of a computer network for use with the overall system, according to embodiments of the present disclosure.

As illustrated in FIG. 15, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving audio data representing an utterance;
processing the audio data using an acoustic model to determine acoustic data representing a plurality of acoustic units corresponding to the audio data;
processing the acoustic data using a language model to generate automatic speech recognition (ASR) data representing a transcript of the utterance;
sending the acoustic data and the ASR data to a natural language understanding (NLU) component; and
after sending the acoustic data and the ASR data to the NLU component:
  processing the ASR data using an intent classification component of the NLU component to generate an intent;
  processing the ASR data using a named entity recognition component of the NLU component to identify a portion of the ASR data that potentially corresponds to an entity, the portion of the ASR data corresponding to a first portion of the audio data;
  determining, using an entity resolution component, a first potential entity at least in part by determining that the portion of the ASR data corresponds to stored lexical data representing the first potential entity;
  determining, using the NLU component, that a portion of the acoustic data corresponds to the portion of the ASR data, the portion of the acoustic data representing at least one acoustic unit of the plurality of acoustic units, the at least one acoustic unit corresponding to the first portion of the audio data;
  determining, using the entity resolution component, a second potential entity at least in part by determining that the portion of the acoustic data corresponds to stored phonetic data representing the second potential entity; and
  executing a command corresponding to the intent and the second potential entity.

2. The computer-implemented method of claim 1, further comprising:
generating, from a plurality of lexical entries in a search index including the stored lexical data, a plurality of phonetic entries using a grapheme-to-phoneme model;
adding the plurality of phonetic entries to the search index;
receiving, from among the plurality of phonetic entries in the search index, one or more potential phonetic results corresponding to the portion of the acoustic data;
ranking the one or more potential phonetic results; and
determining the second potential entity from the one or more potential phonetic results based on the ranking.

3. The computer-implemented method of claim 1, further comprising:
generating, from a plurality of lexical entries in a search index including the stored lexical data, a plurality of phonetic entries using a grapheme-to-phoneme model;
adding the plurality of phonetic entries to the search index;
receiving, from among the plurality of lexical entries and the plurality of phonetic entries in the search index, based on the portion of the acoustic data corresponding to stored phonetic data and the portion of the ASR data corresponding to stored lexical data, one or more potential phonetic results and one or more potential lexical results corresponding to the portion of the acoustic data and the portion of the ASR data;
ranking the one or more potential phonetic results and the one or more potential lexical results; and
determining the second potential entity from the one or more potential phonetic results and the one or more potential lexical results based on the ranking.

4. The computer-implemented method of claim 1, further comprising:
calculating a first confidence score that the first potential entity is represented by the portion of the ASR data; and
determining that the first confidence score is less than a threshold, wherein determining the second potential entity is performed in response to the first confidence score being less than the threshold.

5. The computer-implemented method of claim 1, further comprising:
calculating a first confidence score representing a likelihood that the ASR data represents an accurate transcript of the utterance; and
determining, based at least in part on the first confidence score, to execute the command using the second potential entity.

6. A computer-implemented method, comprising:
receiving audio data representing an utterance;
processing the audio data using an acoustic model to determine first data representing a plurality of acoustic units corresponding to the audio data;
processing the first data using a language model to generate second data representing a transcript of the utterance;
sending the first data and the second data to a natural language understanding (NLU) component; and
after sending the first data and the second data to the NLU component:
  processing the second data using the NLU component to determine that a portion of the second data potentially corresponds to an entity, the portion of the second data corresponding to a first portion of the audio data;
  determining, using an entity resolution component, a first potential entity at least in part by determining that the portion of the second data corresponds to stored lexical data representing the first potential entity;

determining, using the NLU component, that a portion of the first data corresponds to the portion of the second data, the portion of the first data representing at least one acoustic unit of the plurality of acoustic units, the at least one acoustic unit corresponding to the first portion of the audio data;

determining, using the entity resolution component, a second potential entity at least in part by determining that the portion of the first data corresponds to stored phonetic data representing the second potential entity; and performing an action using one of the first potential entity or the second potential entity.

7. The computer-implemented method of claim 6, further comprising:

processing the second data to determine an intent, wherein performing the action includes executing a command corresponding to the intent.

8. The computer-implemented method of claim 7, further comprising:

receiving, from a search index, based on the portion of the first data corresponding to the stored phonetic data and the portion of the second data corresponding to the stored lexical data, one or more potential phonetic results and one or more potential lexical results corresponding to the portion of the first data and the portion of the second data; and ranking the one or more potential phonetic results and the one or more potential lexical results to determine the first potential entity and the second potential entity.

9. The computer-implemented method of claim 6, wherein the portion of the first data represents at least one symbol of a phonetic alphabet.

10. The computer-implemented method of claim 9, further comprising:

generating a plurality of phonetic entries from a plurality of lexical entries in a search index including the stored lexical data, wherein the plurality of phonetic entries are expressed in the phonetic alphabet; and adding the plurality of phonetic entries to the search index.

11. The computer-implemented method of claim 10, further comprising:

receiving, from the search index, based on the portion of the first data corresponding to the stored phonetic data, one or more potential phonetic results corresponding to the at least one symbol; and ranking the one or more potential phonetic results to determine the second potential entity.

12. The computer-implemented method of claim 6, further comprising:

receiving, from a search index, based on the portion of the first data corresponding to the stored phonetic data, one or more potential phonetic results corresponding to the portion of the first data; and ranking the one or more potential phonetic results to determine the second potential entity.

13. The computer-implemented method of claim 6, further comprising:

determining third data representing a likelihood that the first potential entity is represented by the portion of the second data; and determining that the third data representing a likelihood that is less than a threshold, wherein determining the second potential entity is performed in response to the third data representing a likelihood that is less than the threshold.

14. The computer-implemented method of claim 6, further comprising:

determining third data representing a likelihood that the second data represents an accurate transcript of the utterance; and determining, based at least in part on the third data, to perform the action using the second potential entity.

15. A system, comprising:

at least one processor; and at least one memory comprising instructions that, when executed by the at least one processor, cause the system to:

receive audio data representing an utterance;

process the audio data using an acoustic model to determine first data representing a plurality of acoustic units corresponding to the audio data;

process the first data using a language model to generate second data representing a transcript of the utterance;

send the first data and the second data to a natural language understanding (NLU) component; and after sending the first data and the second data to the NLU component:

process the second data using the NLU component to determine that a portion of the second data potentially corresponds to an entity, the portion of the second data corresponding to a first portion of the audio data;

determine, using an entity resolution component, a first potential entity at least in part by determining that the portion of the second data corresponds to stored lexical data representing the first potential entity;

determine, using the NLU component, that a portion of the first data corresponds to the portion of the second data, the portion of the first data representing at least one acoustic unit of the plurality of acoustic units, the at least one acoustic unit corresponding to the first portion of the audio data;

determine, using the entity resolution component, a second potential entity at least in part by determining that the portion of the first data corresponds to stored phonetic data representing the second potential entity; and perform an action using one of the first potential entity or the second potential entity.

16. The system of claim 15, wherein the at least one memory further comprises instructions that, when executed by the at least one processor, further cause the system to:

processing the second data to determine an intent, wherein performing the action includes executing a command corresponding to the intent.

17. The system of claim 16, wherein the at least one memory further comprises instructions that, when executed by the at least one processor, further cause the system to:

receive, from a search index, based on the portion of the first data corresponding to the stored phonetic data and the portion of the second data corresponding to the stored lexical data, one or more potential phonetic results and one or more potential lexical results corresponding to the portion of the first data and the portion of the second data; and rank the one or more potential phonetic results and the one or more potential lexical results to determine the first potential entity and the second potential entity.

18. The system of claim 15, wherein the portion of the first data represents at least one symbol of a phonetic alphabet.

19. The system of claim 18, wherein the at least one memory further comprises instructions that, when executed by the at least one processor, further cause the system to:
generate a plurality of phonetic entries from a plurality of lexical entries in a search index including the stored lexical data, wherein the plurality of phonetic entries are expressed in the phonetic alphabet; and
add the plurality of phonetic entries to the search index.

20. The system of claim 19, wherein the at least one memory further comprises instructions that, when executed by the at least one processor, further cause the system to:
receive, from the search index, based on the portion of the first data corresponding to the stored phonetic data, one or more potential phonetic results corresponding to the at least one symbol; and
rank the one or more potential phonetic results to determine the second potential entity.

21. The system of claim 15, wherein the at least one memory further comprises instructions that, when executed by the at least one processor, further cause the system to:
receive, from a search index, based on the portion of the first data corresponding to the stored phonetic data, one or more potential phonetic results corresponding to the portion of the first data; and
rank the one or more potential phonetic results to determine the second potential entity.

22. The system of claim 15, wherein the at least one memory further comprises instructions that, when executed by the at least one processor, further cause the system to:
determine third data representing a likelihood that the first potential entity is represented by the portion of the second data; and
determine that the third data represents likelihood that is less than a threshold, wherein the second potential entity is determined in response to the third data representing a likelihood that is less than the threshold.

23. The system of claim 15, wherein the at least one memory further comprises instructions that, when executed by the at least one processor, further cause the system to:
determine third data representing a likelihood that the second data represents an accurate transcript of the utterance; and
determine, based at least in part on the third data, to perform the action using the second potential entity.

* * * * *